(12) United States Patent
Feng

(10) Patent No.: US 9,723,260 B2
(45) Date of Patent: Aug. 1, 2017

(54) VOICE TRACKING CAMERA WITH SPEAKER IDENTIFICATION

(75) Inventor: Jinwei Feng, Woburn, MA (US)

(73) Assignee: Polycom, Inc., San Jose, CA (US)

( * ) Notice: Subject to any disclaimer, the term of this patent is extended or adjusted under 35 U.S.C. 154(b) by 582 days.

(21) Appl. No.: 12/782,173

(22) Filed: May 18, 2010

(65) Prior Publication Data

US 2011/0285807 A1    Nov. 24, 2011

(51) Int. Cl.
  *H04N 7/14*       (2006.01)
  *G06K 9/00*       (2006.01)
  *H04N 5/232*      (2006.01)
  *G10L 17/00*      (2013.01)

(52) U.S. Cl.
  CPC ......... *H04N 7/142* (2013.01); *G06K 9/00228* (2013.01); *G06K 9/00892* (2013.01); *H04N 5/232* (2013.01); *G10L 17/00* (2013.01)

(58) Field of Classification Search
  USPC .............................................. 348/14.1–14.16
  See application file for complete search history.

(56) References Cited

U.S. PATENT DOCUMENTS

| | | | |
|---|---|---|---|
| 5,778,082 A | 7/1998 | Chu et al. | |
| 5,844,599 A | 12/1998 | Hildin | |
| 6,005,610 A | 12/1999 | Pingali | |
| 6,192,342 B1 * | 2/2001 | Akst | H04N 7/142 348/E7.079 |
| 6,377,995 B2 * | 4/2002 | Agraharam et al. | 709/231 |
| 6,496,607 B1 | 12/2002 | Krishnamurthy et al. | |
| 6,577,333 B2 | 6/2003 | Tai et al. | |
| 6,593,956 B1 | 7/2003 | Potts et al. | |
| 6,707,489 B1 * | 3/2004 | Maeng | G01S 3/7864 348/14.08 |
| 6,731,334 B1 | 5/2004 | Maeng et al. | |
| 6,766,035 B1 * | 7/2004 | Gutta | 382/103 |
| 6,798,441 B2 | 9/2004 | Hartman et al. | |
| 6,922,206 B2 | 7/2005 | Chu et al. | |
| 6,980,485 B2 | 12/2005 | McCaskill | |

(Continued)

OTHER PUBLICATIONS

Klechenov, "Real-time Mosaic for Multi-Camera Videoconferencing," Singapore—MIT Alliance, National University of Singapore, Manuscript received Nov. 1, 2002.

(Continued)

*Primary Examiner* — Fan Tsang
*Assistant Examiner* — Jeffrey Lytle
(74) *Attorney, Agent, or Firm* — Blank Rome LLP

(57) ABSTRACT

A videoconferencing apparatus automatically tracks speakers in a room and dynamically switches between a controlled, people-view camera and a fixed, room-view camera. When no one is speaking, the apparatus shows the room view to the far-end. When there is a dominant speaker in the room, the apparatus directs the people-view camera at the dominant speaker and switches from the room-view camera to the people-view camera. When there is a new speaker in the room, the apparatus switches to the room-view camera first, directs the people-view camera at the new speaker, and then switches to the people-view camera directed at the new speaker. When there are two near-end speakers engaged in a conversation, the apparatus tracks and zooms-in the people-view camera so that both speakers are in view.

22 Claims, 12 Drawing Sheets

(56) References Cited

U.S. PATENT DOCUMENTS

| | | | |
|---|---|---|---|
| 7,039,199 B2 | 5/2006 | Rui | |
| 7,057,636 B1* | 6/2006 | Cohen-Solal | G01S 3/7864 |
| | | | 348/14.08 |
| 7,349,008 B2 | 3/2008 | Rui et al. | |
| 7,806,604 B2 | 10/2010 | Bazakos et al. | |
| 2002/0101505 A1* | 8/2002 | Gutta et al. | 348/14.07 |
| 2002/0113862 A1 | 8/2002 | Center et al. | |
| 2002/0140804 A1 | 10/2002 | Colmenarez et al. | |
| 2004/0037436 A1* | 2/2004 | Rui | 381/92 |
| 2005/0243168 A1* | 11/2005 | Cutler | 348/14.12 |
| 2005/0267762 A1* | 12/2005 | Ichikawa et al. | 704/278 |
| 2006/0012671 A1* | 1/2006 | Nimri et al. | 348/14.08 |
| 2006/0209194 A1 | 9/2006 | Liu et al. | |
| 2006/0222354 A1 | 10/2006 | Mori et al. | |
| 2006/0291478 A1* | 12/2006 | Cutler et al. | 370/395.52 |
| 2007/0046775 A1* | 3/2007 | Ferren et al. | 348/14.08 |
| 2007/0071206 A1* | 3/2007 | Gainsboro | H04M 3/2281 |
| | | | 379/168 |
| 2007/0153091 A1* | 7/2007 | Watlington | H04N 7/15 |
| | | | 348/208.14 |
| 2007/0188596 A1* | 8/2007 | Kenoyer | H04L 29/06027 |
| | | | 348/14.08 |
| 2008/0095401 A1 | 4/2008 | Saleh et al. | |
| 2008/0218582 A1 | 9/2008 | Buckler | |
| 2008/0297587 A1 | 12/2008 | Kurtz et al. | |
| 2010/0085415 A1* | 4/2010 | Rahman | 348/14.08 |
| 2010/0123770 A1 | 5/2010 | Friel et al. | |

OTHER PUBLICATIONS

"Polycom (R) HDX 7000 Series: Features and Benefits," (c) 2008 Polycom, Inc.

"Polycom (R) HDX 8000 Series: Features and Benefits," (c) 2007 Polycom, Inc.

Hasan, "Speaker Indentification Using MEL Frequency Cepstral Coefficients," 3rd International Conference on Electrical & Computer Engineering, ICECE 2004, Dec. 28-30, 2004, Dhaka, Bangladesh, pp. 565-568.

1 PC Network Inc., Video Conferencing Equipment and Services, "Sony PCSG70N and PCSG70S—4 Mbps High-End Videoconferencing Systems (with or without camera)," obtained from http://www.1pcn.com/sony/pcs-g70/index.htm, generated on Apr. 5, 2010, 8 pages.

First Office Action in co-pending Appl. No., mailed Jun. 29, 2011.

Reply to First Office Action (mailed Jun. 29, 2011) in co-pending Appl. No.

First Office Action in co-pending U.S. Appl. No. 12/782,155, mailed Aug. 4, 2011.

Reply to First Office Action (mailed Aug. 4, 2011) in co-pending U.S. Appl. No. 12/782,155.

Office Action in co-pending Appl. No., mailed Jan. 26, 2012.

Reply to Office Action (mailed Jan. 26, 2012) in co-pending Appl. No., filed Jun. 26, 2012.

* cited by examiner

| RECORD | ID INFORMATION | LOCATION | SPEECH CHARACTERISTICS | DURATION | FREQUENCY |
|---|---|---|---|---|---|
| 0001 | NAME 01 | P1, T1, Z1 | SC1 | 0 | 3X |
| 0002 | NAME 02 | P2, T2, Z2 | SC2 | 1 | 1X |
| 0003 | NAME 03 | P3, T3, Z3 | SC3 | .5 | 5X |

VOICE TRACKING CAMERA WITH SPEAKER IDENTIFICATION

CROSS-REFERENCE TO RELATED APPLICATIONS

This application is filed concurrently with U.S. patent applications having Ser. No. 12/782,137 entitled "Videoconferencing Endpoint Having Multiple Voice-Tracking Cameras" and Ser. No. 12/782,155 entitled "Automatic Camera Framing for Videoconferencing," which are incorporated herein by reference in their entireties.

BACKGROUND

Typically, a camera in a videoconference captures a view that fits all the participants. Unfortunately, far-end participants may lose much of the value in the video because the size of the near-end participants displayed at the far-end may be too small. In some cases, the far-end participants cannot see the facial expressions of the near-end participants and may have difficulty determining who is actually speaking. These problems give the videoconference an awkward feel and make it hard for the participants to have a productive meeting.

To deal with poor framing, participants have to intervene and perform a series of operations to pan, tilt, and zoom the camera to capture a better view. As expected, manually directing the camera with a remote control can be cumbersome. Sometime, participants just do not bother adjusting the camera's view and simply use the default wide shot. Of course, when a participant does manually frame the camera's view, the procedure has to be repeated if participants change positions during the videoconference or use a different seating arrangement in a subsequent videoconference.

Voice-tracking cameras having microphone arrays can help direct cameras during a videoconference toward participants who are speaking. Although these types of cameras are very useful, they can encounter some problems. When a speaker turns away from the microphones, for example, the voice-tracking camera may lose track of the speaker. In a very reverberant environment, the voice-tracking camera may direct at a reflection point rather than at an actual sound source. Typical reflections can be produced when the speaker turns away from the camera or when the speaker sits at an end of a table. If the reflections are troublesome enough, the voice-tracking camera may be guided to point to a wall, a table, or other surface instead of the actual speaker.

For these reasons, it is desirable during a videoconference to be able to tailor the view of participants dynamically based on the meeting environment, arrangement of participants, and the persons who are actually speaking. The subject matter of the present disclosure is directed to overcoming, or at least reducing the effects of, one or more of the problems set forth above.

SUMMARY

Methods, programmable storage devices, and videoconferencing apparatus are disclosed for performing automated videoconferencing techniques.

In one technique, at least two cameras of an endpoint capture video of participants in an environment in a controlled manner that accommodates the dynamic nature of who is speaking. For example, a first camera at an endpoint captures first video in a wide view of the videoconference environment. When a participant speaks and their location is determined at the endpoint, a second camera at the endpoint directs at the speakers location, and the endpoint switches output for the videoconference from the wide view of environment captured with the first camera to a tight view of the speaker captured with the second camera.

If another participant then starts speaking, then the endpoint determine the new speaker's location. Before directing the second camera at the new speaker's location, however, the endpoint switches output for the videoconference from the tight view of the second camera to the wide tight view of the first camera. While this wide view is output, the second camera is directed at the new speaker's location. Once done, the endpoint switches output for the videoconference from the wide view of the first camera to a tight view of the new speaker captured with the second camera. Various techniques, including motion detection, skin tone detection, and facial recognition are used to frame the speakers in tight views with the cameras. Likewise, the endpoint can use various rules govern when and if video output is switched and directing the second camera at an audio source is done.

In another technique, video captured with one or more cameras at an endpoint is used to frame the environment automatically during the videoconference with wide and tight views by the one or more cameras. For example, a wide view of the videoconference environment can be segmented into a number of tight views. The endpoint directs a first camera to frame each of these tight views and captured video. Then, the endpoint determines the relevance of each of the tight views by analyzing the video captured with the first camera in each of the tight views. The relevance of each tight view can be determined based on motion detection, skin tone detection, and facial recognition. Once the relevant tight views are determined in this process, the endpoint determines an overall framed view defined by the relevant tight views. For example, the framed view can be bounded by the topmost, leftmost, and rightmost tight views that are relevant. In this way, either the same camera or a different camera can be directed to frame this framed view so well-framed video can be output for the videoconference.

In yet another technique, an endpoint uses speech recognition to control one or more cameras during a videoconference. In this technique, initial speech characteristics for participants in the videoconference are stored along the participants' associated locations in the environment. As the videoconference proceeds, the endpoint detects audio indicative of speech and determining the current speech characteristic of that detected audio. The current speech characteristic is then matched to one of the stored speech characteristics. Obtaining the associated location for the matching participant, the endpoint directs a camera at the associated location of the matching participant. In this way, the endpoint may not need to rely exclusively on the voice tracking capabilities of the endpoint and its array of microphones. Rather, the speech characteristics of participants can be stored along with source locations found through such voice tracking capabilities. Then, if the voice tracking fails or cannot locate a source, the speech recognition techniques can be used to direct the camera at the speaker's location.

The foregoing summary is not intended to summarize each potential embodiment or every aspect of the present disclosure.

BRIEF DESCRIPTION OF THE DRAWINGS

FIGS. 1C-1E show plan views of videoconferencing endpoints.

FIGS. 2B-2D show alternate configurations for the videoconferencing device.

DETAILED DESCRIPTION

A. Videoconferencing Endpoint

Figure 1A:
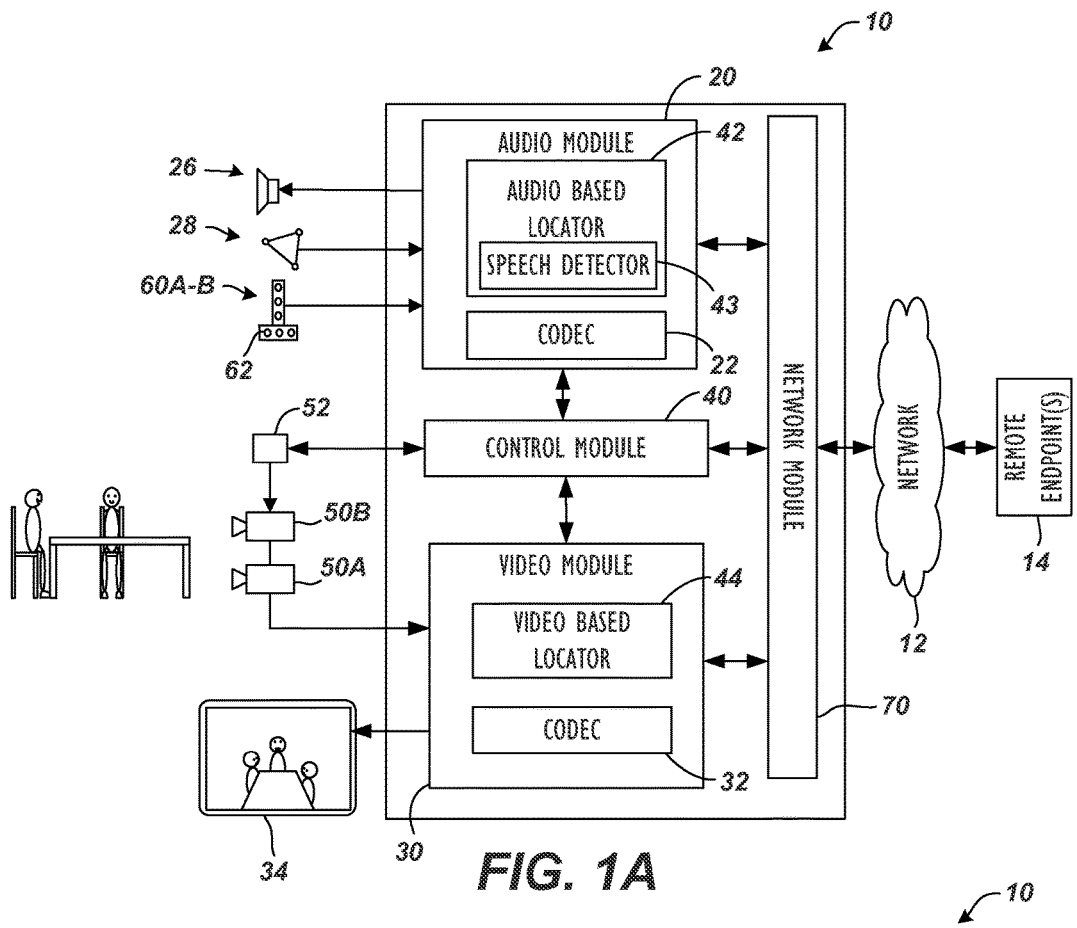
FIG. 1A illustrates a videoconferencing endpoint according to certain teachings of the present disclosure.

A videoconferencing apparatus or endpoint 10 in FIG. 1A communicates with one or more remote endpoints 14 over a network 12. Among some common components, the endpoint 10 has an audio module 20 with an audio codec 22 and has a video module 30 with a video codec 32. These modules 20130 operatively couple to a control module 40 and a network module 70.

During a videoconference, two or more cameras 50A-B capture video and provide the captured video to the video module 30 and codec 32 for processing. Additionally, one or more microphones 28 capture audio and provide the audio to the audio module 20 and codec 22 for processing. These microphones 28 can be table or ceiling microphones, or they can be part of a microphone pod or the like. The endpoint 10 uses the audio captured with these microphones 28 primarily for the conference audio.

Separately, microphone arrays 60A-B having orthogonally arranged microphones 62 also capture audio and provide the audio to the audio module 22 for processing. Preferably, the microphone arrays 60A-B include both vertically and horizontally arranged microphones 62 for determining locations of audio sources during the videoconference. Therefore, the endpoint 10 uses the audio from these arrays 60A-B primarily for camera tracking purposes and not for conference audio, although their audio could be used for the conference.

After capturing audio and video, the endpoint 10 encodes it using any of the common encoding standards, such as MPEG-1, MPEG-2, MPEG-4, H.261, H.263 and H.264. Then, the network module 70 outputs the encoded audio and video to the remote endpoints 14 via the network 12 using any appropriate protocol. Similarly, the network module 70 receives conference audio and video via the network 12 from the remote endpoints 14 and sends these to their respective codec 22/32 for processing. Eventually, a loudspeaker 26 outputs conference audio, and a display 34 outputs conference video. Many of these modules and other components can operate in a conventional manner well known in the art so that further details are not provided here.

In contrast to a conventional arrangement, the endpoint 10 uses the two or more cameras 50A-B in an automated and coordinated manner to handle video and views of the videoconference environment dynamically. A first camera 50A can be a fixed or room-view camera, and a second camera 50B can be a controlled or people-view camera. Using the room-view camera 50A, for example, the endpoint 10 captures video of the room or at least a wide or zoomed-out view of the room that would typically include all the videoconference participants as well as some of the surroundings. Although described as fixed, the room-view camera 50A can actually be adjusted by panning, tilting, and zooming to control its view and frame the environment.

By contrast, the endpoint 10 uses the people-view camera 50B to capture video of one or more particular participants, and preferably one or more current speakers, in a Light or zoomed-in view. Therefore, the people-view camera 50B is particularly capable of panning, tilting, and zooming.

In one arrangement, the people-view camera 50B is a steerable Pan-Tilt-Zoom (PTZ) camera, while the room-view camera 50A is an Electronic Pan-Tilt-Zoom (EPTZ) camera. As such, the people-view camera 50B can be steered, while the room-view camera 50A can be operated electronically to alter its viewing orientation rather than being steerable. However, the endpoint 10 can use other arrangements and types of cameras. In fact, both cameras 50A-B can be steerable PTZ cameras. Moreover, switching between wide and zoomed views can be shared and alternated between the two steerable cameras 50A-B so that one captures wide views when appropriate while the other captures zoomed-in views and vice-versa.

For the purposes of the present disclosure, one camera 50A is referred to as a room-view camera, while the other camera 50B is referred to as a people-view camera. Although it may be desirable to alternate between tight views of a speaker and wide views of a room, there may be situations where the endpoint 10 can alternate between two different tight views of the same or different speaker. To do this, it may be desirable to have the two cameras 50A-B both be steerable PTZ cameras as noted previously. In another arrangement, therefore, both the first and second cameras 50A-B can be a controlled or people-view camera, such as steerable PTZ cameras. The endpoint 10 can use each of these cameras 50A-B to capture video of one or more particular participants, and preferably one or more current speakers, in a tight or zoomed-in view as well as providing a wide or zoomed-out view of the room when needed.

In one implementation, the endpoint 10 outputs only video from one of the two cameras 50A-B at any specific time. As the videoconference proceeds, the output video from the endpoint 10 can then switch between the room-view and people-view cameras 50A-B from time to time. In general, the system 10 outputs the video from room-view camera 50A when there is no participant speaking (or operation has degraded), and the endpoint 10 outputs the video from people-view camera 50B when one or more participants are speaking. In one benefit, switching between these camera views allows the far-end of the videoconference to appreciate the zoomed-in views of active speakers while still getting a wide view of the meeting room from time to time.

As an alternative, the endpoint 10 can transmit video from both cameras simultaneously, and the endpoint 10 can let the remote endpoint 14 decide which view to show, especially if the endpoint 10 sends some instructions for selecting one or the other camera view. In yet another alternative, the endpoint 10 can transmit video from both cameras simultaneously so one of the video images can be composited as a picture-in-picture of the other video image. For example, the people-view video from camera 50B can be composited with the room-view from camera 50A to be sent to the far end in a picture-in-picture (PIP) format.

To control the views captured by the two cameras 50A-B, the endpoint 10 uses an audio based locator 42 and a video-based locator 44 to determine locations of participants and frame views of the environment and participants. Then, the control module 40 operatively coupled to the audio and video modules 20/30 uses audio and/or video information from these locators 42/44 to send camera commands to one or both of the cameras 50A-B to alter their orientations and the views they capture. For the people-view camera 50B, these camera commands can be implemented by an actuator or local control unit 52 having motors, servos, and the like that steer the camera 50B mechanically. For the room-view camera 50B, these camera commands can be implemented as electronic signals to be handled by the camera 50B.

To determine which camera 50A-B to use and how to configure its view, the control module 40 uses audio information obtained from the audio-based locator 42 and/or video information obtained from the video-based locator 44. For example and as described in more detail below, the control module 40 uses audio information processed by the audio based locator 42 from the horizontally and vertically arranged microphone arrays 60A-60B. The audio based locator 42 uses a speech detector 43 to detect speech in captured audio from the arrays 60A-60B and then determines a location of a current speaker. The control module 40 using the determined location to then steer the people-view camera 50B toward that location. As also described in more detail below, the control module 40 uses video information processed by the video-based location 44 from the cameras 50A-B to determine the locations of participants, to determine the framing for the views, and to steer the people-view camera 50B at the participants.

The wide view from the room-view camera 50A can give context to the people-view camera 50B and can be used so that participants at the far-end do not see video from the people-view camera 50B as it moves toward a participant. In addition, the wide view can be displayed at the far-end when multiple participants at the near-end are speaking or when the people-view camera 50B is moving to direct at multiple speakers. Transitions between the two views from the cameras 50A-B can be faded and blended as desired to avoid sharp cut-a-ways when switching between camera views.

As the people-view camera 50B is moved toward the speaker, for example, the moving video from this camera 50B is preferably not transmitted to the far-end of the videoconference. Instead, the video from the room-view camera 50A is transmitted. Once the people-view camera 50B has properly framed the current speaker, however, the endpoint 10 switches between the video from the cameras 50A-B.

All the same, the endpoint 10 preferably does not simply switch automatically to capture views of speakers. Instead, camera changes are preferably timed. Too many camera switches over a period of time can be distracting to the conference participants. Accordingly, the endpoint 10 preferably tracks those speakers using their locations, their voice characteristics, their frequency of speaking, and the like. Then, when one speaker begins speaking, the endpoint 10 can quickly direct the people-view camera 50B at that frequent speaker, but the endpoint 10 can avoid or delay jumping to another speaker who may only be responding with short answers or comments.

Although the endpoint 10 preferably operates without user intervention, the endpoint 10 may allow for user intervention and control. Therefore, camera commands from either one or both of the far and near ends can be used to control the cameras 50A-B. For example, the participants can determine the best wide view to be displayed when no one is speaking. Meanwhile, dynamic camera commands can control the people-view camera 50B as the videoconference proceeds. In this way, the view provided by the people-view camera 50B may be controlled automatically by the endpoint 10.

Figure 1B:
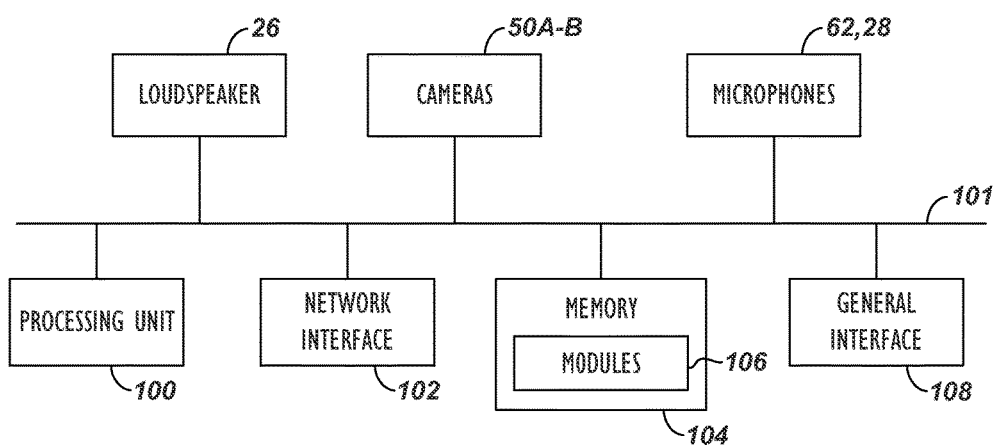
FIG. 1B illustrates components of the videoconferencing endpoint of FIG. 1A.

FIG. 1B shows some exemplary components for the videoconferencing endpoint 10 of FIG. 1A. As shown and discussed above, the endpoint 10 has two or more cameras 50A-B and several microphones 28/62A-B. In addition to these, the endpoint 10 has a processing unit 100, a network interface 102, memory 104, and a general input/output (I/O) interface 108 all coupled via a bus 101.

The memory 104 can be any conventional memory such as SDRAM and can store modules 106 in the form of software and firmware for controlling the endpoint 10. In addition to video and audio codecs and other modules discussed previously, the modules 106 can include operating systems, a graphical user interface (GUI) that enables users to control the endpoint 10, and algorithms for processing audio/video signals and controlling the cameras 50A-B as discussed later.

The network interface 102 provides communications between the endpoint 10 and remote endpoints (not shown). By contrast, the general 110 interface 108 provides data transmission with local devices such as a keyboard, mouse, printer, overhead projector, display, external loudspeakers, additional cameras, microphone pods, etc. The endpoint 10 can also contain an internal loudspeaker 26.

The cameras 50A-B and the microphone arrays 60A-B capture video and audio, respectively, in the videoconference environment and produce video and audio signals transmitted via the bus 101 to the processing unit 100. Here, the processing unit 100 processes the video and audio using algorithms in the modules 106. For example, the endpoint 10 processes the audio captured by the microphones 28/62A-B as well as the video captured by the cameras 50A-B to determine the location of participants and direct the views of the cameras 50A-B. Ultimately, the processed audio and video can be sent to local and remote devices coupled to interlaces 102/108.

In the plan view of FIG. 1C, one arrangement of the endpoint 10 uses a videoconferencing device 80 having microphone arrays 60A-B and two cameras 50A-B integrated therewith. A microphone pod 28 can be placed on a table, although other types of microphones, such as ceiling microphones, individual table microphones, and the like, can be used. The microphone pod 28 communicatively connects to the videoconferencing device 80 and captures audio for the videoconference. For its part, the device 80 can be incorporated into or mounted on a display and/or a videoconferencing unit (not shown).

Figure 10:
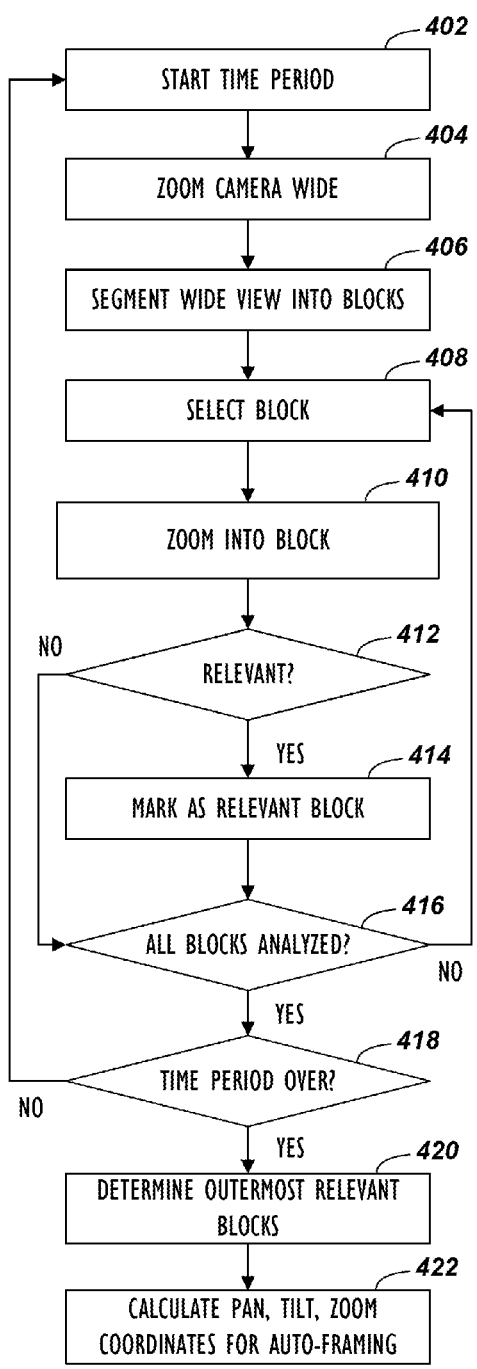
FIG. 10 illustrates a process for auto-framing a view of participants using the disclosed endpoint.

FIG. 10 shows a plan view of another arrangement of the endpoint 10. Here, the endpoint 10 has several devices 80/81 mounted around the room and has a microphone pod 28 on a table. One main device 80 has microphone arrays 60A-B and two cameras 50A-B as before and can be incorporated into or mounted on a display and/or videoconferencing unit (not shown). The other devices 81 couple to the main device 80 and can be positioned on sides of the videoconferencing environment.

The auxiliary devices 81 at least have a people-view camera 50B, although they can have a room-view camera 50A, microphone arrays 60A-B, or both and can be the same as the main device 80. Either way, audio and video processing described herein can identify which people-view camera 50B has the best view of a speaker in the environment. Then, the best people-view camera 50B for the speaker can be selected from those around the room so that a frontal view (or the one closest to this view) can be used for conference video.

Figure 1E:
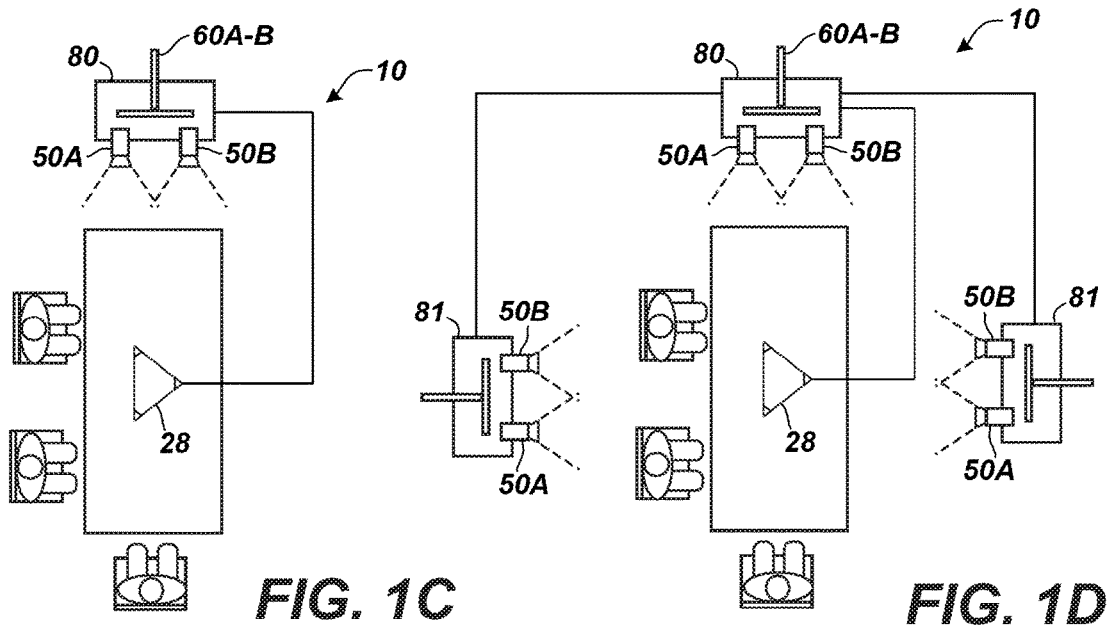
Figure 1E:
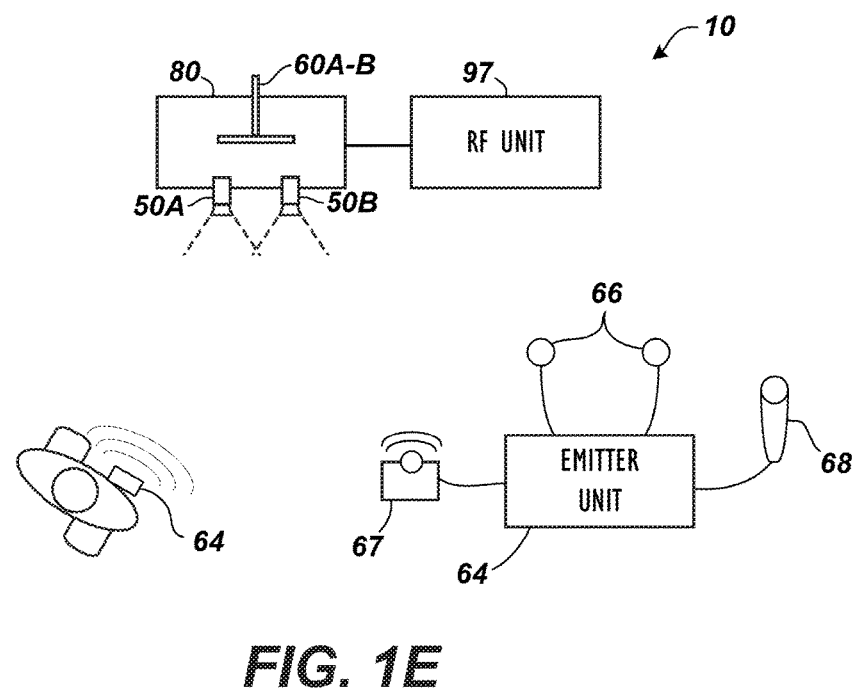

In FIG. 1E, another arrangement of the endpoint 10 includes a videoconferencing device 80 and a remote emitter 64. This arrangement can be useful for tracking a speaker who moves during a presentation. Again, the device 80 has the cameras 50A-B and microphone arrays 60A-B. In this arrangement, however, the microphone arrays 60A-B are responsive to ultrasound emitted from the emitter 64 to track a presenter. In this way, the device 80 can track the presenter as he/she moves and as the emitter 64 continues to emit ultrasound. In addition to ultrasound, the microphone arrays 60A-B can be responsive to voice audio as well so that the device 80 can use voice tracking in addition to ultrasonic tracking. When the device 80 automatically detects ultrasound or when the device 80 is manually configured for ultrasound tracking, then the device 80 can operate in an ultrasound tracking mode.

As shown, the emitter 64 can be a pack worn by the presenter. The emitter 64 can have one or more ultrasound transducers 66 that produce an ultrasound tone and can have an integrated microphone 68 and a radio frequency (RF) emitter 67. When used, the emitter unit 64 may be activated when the integrated microphone 68 picks up the presenter speaking. Alternatively, the presenter can actuate the emitter unit 64 manually so that an RF signal is transmitted to an RF unit 97 to indicate that this particular presenter will be tracked. Details related to camera tracking based on ultrasound are disclosed in U.S. Pat. Pub. No. 2008/0095401, which is incorporated herein by reference in its entirety.

B. Videoconferencing Device

Figure 2A:
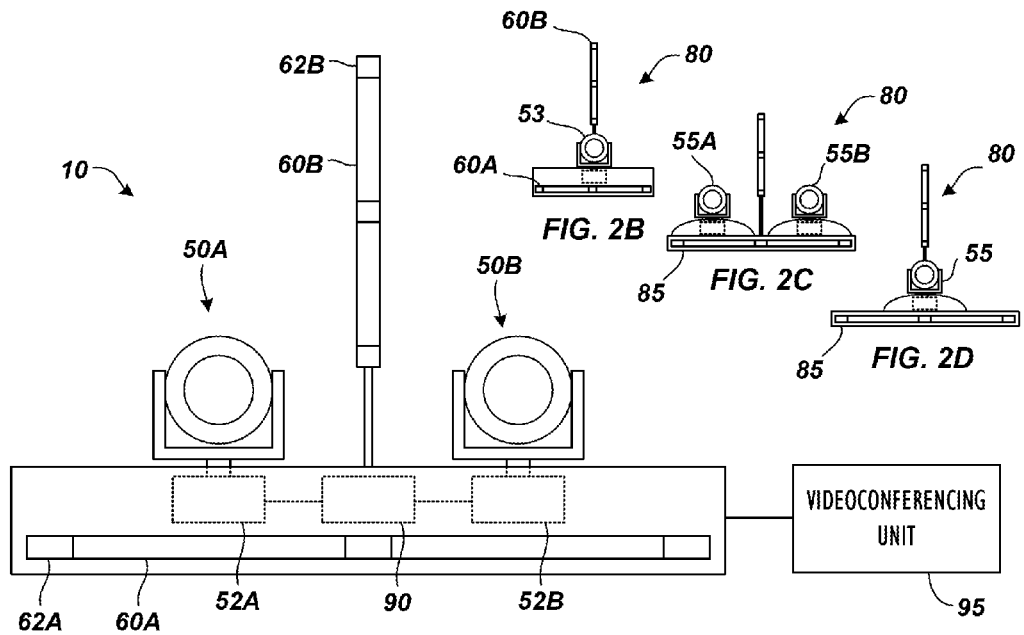
FIG. 2A shows a videoconferencing device for an endpoint according to the present disclosure.

Before turning to operation of the endpoint 10 during a videoconference, discussion first turns to details of a videoconferencing device according to the present disclosure. As shown in FIG. 2A, a videoconferencing device 80 has a housing with a horizontal array 60A of microphones 62A disposed thereon. Extending from this housing, a vertical array 60B also has several microphones 62B. As shown, these arrays 60A-B can each have three microphones 62A-B, although either array 60A-B can have a different number than depicted.

The first camera 50A is the room-view camera intended to obtain wide or zoomed-out views of a videoconference environment. The second camera 50B is the people-view camera intended to obtain tight or zoomed-in views of videoconference participants. These two cameras 50A-B are mounted on the housing of the device 80 and can be integrated therewith. The room-view camera 50A has image processing components 52A that can include an actuator if not an EPTZ camera. The people-view camera 50B also has image processing components 52B that include an actuator to control the pan-tilt-zoom of the camera's operation. These components 52A-B can be operatively coupled to a local control unit 90 housed in the device 80.

For its part, the control unit 90 can include all or part of the necessary components for conducting a videoconference, including audio and video modules, network module, camera control module, etc. Alternatively, all or some of the necessary videoconferencing components may be housed in a separate videoconferencing unit 95 coupled to the device 80. As such, the device 80 may be a stand-alone unit having the cameras 50A-B, the microphone arrays 60A-B, and other related components, while the videoconferencing unit 95 handles all of the videoconferencing functions. Of course, the device 80 and the unit 95 can be combined into one unit if desired.

Rather than having two or more integrated cameras 50A-B as in FIG. 2A, the disclosed device 80 as shown in FIG. 2B can have one integrated camera 53. Alternatively as shown in FIGS. 2C-2D, the device 80 can include a base unit 85 having the microphone arrays 60A-B, communication ports (not shown), and other processing components (not shown). Two or more separate camera units 55A-B can connect onto the base unit 85 to make the device 80 (FIG. 2C), or one separate camera unit 55 can be connected thereon (FIG. 2D). Accordingly, the base unit 85 can hold the microphone arrays 60A-B and all other required electronic and signal processing components and can support the one or more camera units 55 using an appropriate form of attachment.

Although the device 80 has been shown having two cameras 50A-B situated adjacent to one another, either one or both of the cameras 50A-B can be entirely separate from the device 80 and connected to an input of the housing. In addition, the device 80 can be configured to support additional cameras instead of just two. In this way, users could install other cameras, which can be wirelessly connected to the device 80 and positioned around a room, so that the device 80 can always select the best view for a speaker.

Figure 3:
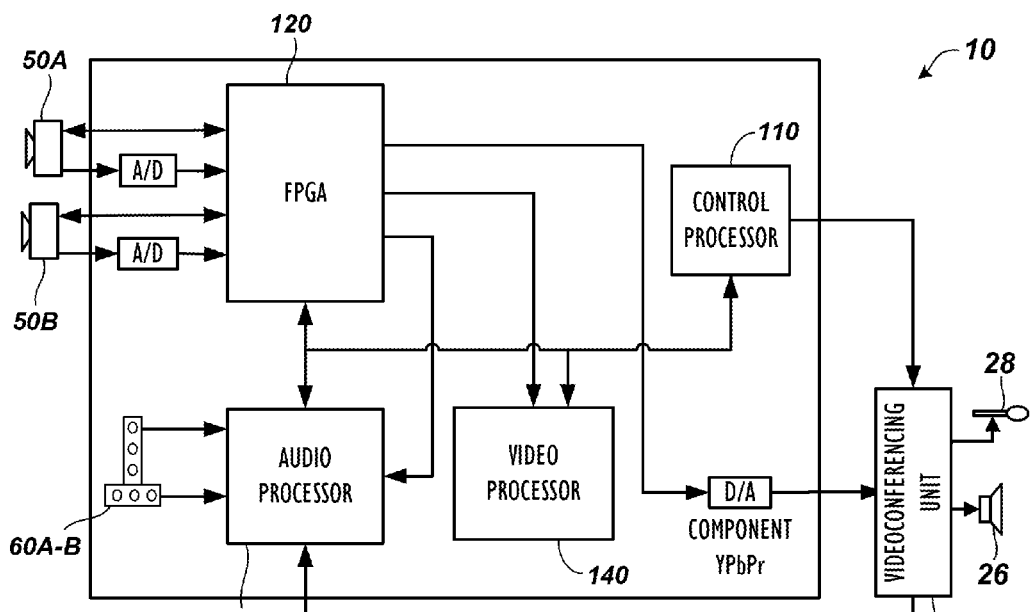
FIG. 3 illustrates components of the videoconferencing device of FIGS. 2A-2D.

FIG. 3 briefly shows some exemplary components that can be part of the device 80 of FIGS. 2A-2D. As shown, the device 80 includes the microphone arrays 60A-B, a control processor 110, a Field Programmable Gate Array (FPGA) 120, an audio processor 130, and a video processor 140. As noted previously, the device 80 can be an integrated unit having the two or more cameras 50A-B integrated therewith (See FIG. 2A), or these cameras 50A-B can be separate units having their own components and connecting to the device's base unit (See FIG. 2C). In addition, the device 80 can have one integrated camera (53; FIG. 2B) or one separate camera (55; FIG. 2D).

During operation, the FPGA 120 captures video inputs from the cameras 50A-B, generates output video for the videoconferencing unit 95, and sends the input video to the video processor 140. The FPGA 120 can also scale and composite video and graphics overlays. The audio processor 130, which can be a Digital Signal Processor, captures audio from the microphone arrays 60A-B and performs audio processing, including echo cancelation, audio filtering, and source tracking. The audio processor 130 also handles rules for switching between camera views, for detecting conversational patterns, and other purposes disclosed herein.

The video processor 140, which can also be a Digital Signal Processor (DSP), captures video from the FPGA 120 and handles motion detection, face detection, and other video processing to assist in tracking speakers. As described in more detail below, for example, the video processor 140 can perform a motion detection algorithm on video captured from the people-view camera 50B to check for motion in the current view of a candidate speaker location found by a speaker tracking algorithm. This can avoid directing the camera 50B at reflections from walls, tables, or the like. In addition, the video processor 140 can use a face-finding algorithm to further increase the tracking accuracy by confirming that a candidate speaker location does indeed frame a view having a human face.

The control processor 110, which can be a general-purpose processor (GPP), handles communication with the videoconferencing unit 95 and handles camera control and overall system control of the device 80. For example, the control processor 110 controls the pan-tilt-zoom communication for the cameras' components and controls the camera switching by the FPGA 120.

C. Control Scheme

Figure 4A:
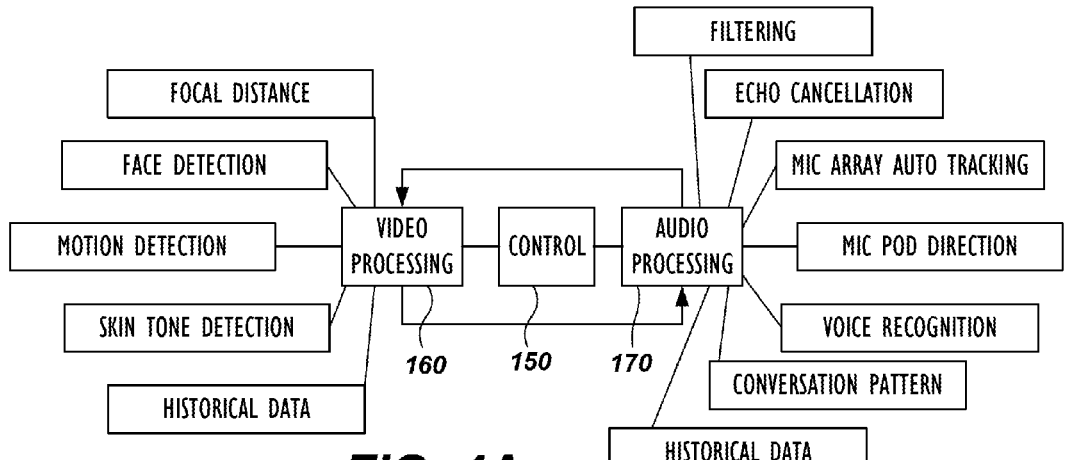
FIG. 4A illustrates a control scheme for the disclosed endpoint using both audio and video processing.

With an understanding of the videoconferencing endpoint and components described above, discussion now turns to operation of the disclosed endpoint 10. First, FIG. 4A shows a control scheme 150 used by the disclosed endpoint 10 to conduct a videoconference. As intimated previously, the control scheme 150 uses both video processing 160 and audio processing 170 to control operation of the cameras 50A-B during the videoconference. The processing 160 and 170 can be done individually or combined together to enhance operation of the endpoint 10. Although briefly described below, several of the various techniques for audio and video processing 160 and 170 are discussed in more detail later.

Briefly, the video processing 160 can use focal distance from the cameras 50A-B to determine distances to participants and can use video-based techniques based on color, motion, and facial recognition to track participants. As shown, the video processing 160 can, therefore, use motion detection, skin tone detection, face detection, and other algorithms to process the video and control operation of the cameras 50A-B. Historical data of recorded information obtained during the videoconference can also be used in the video processing 160.

For its part, the audio processing 170 uses speech tracking with the microphone arrays 60A-B. To improve tracking accuracy, the audio processing 170 can use a number of filtering operations known in the art. For example, the audio processing 170 preferably performs echo cancellation when performing speech tracking so that coupled sound from the endpoint's loudspeaker is not be picked up as if it is a dominant speaker. The audio processing 170 also uses filtering to eliminate non-voice audio from voice tracking and to ignore louder audio that may be from a reflection.

The audio processing 170 can use processing from additional audio cues, such as using a tabletop microphone element or pod (28; FIG. 1). For example, the audio processing 170 can perform voice recognition to identify voices of speakers and can determine conversation patterns in the speech during the videoconference. In another example, the audio processing 170 can obtain direction (i.e., pan) of a source from a separate microphone pod (28) and combine this with location information obtained with the microphone arrays 60A-B. Because the microphone pod (28) can have several microphones positioned in different directions, the position of an audio source relative to those directions can be determined.

When a participant initially speaks, the microphone pod (28) can obtain the direction of the participant relative to the microphone pod (28). This can be mapped to the participant's location obtained with the arrays (60A-B) in a mapping table or the like. At some later time, only the microphone pod (28) may detect a current speaker so that only its directional information is obtained. However, based on the mapping table, the endpoint 10 can locate the current speaker's location (pan, tilt, zoom coordinates) for framing the speaker with the camera using the mapped information.

D. Operational Overview

Figure 4B:
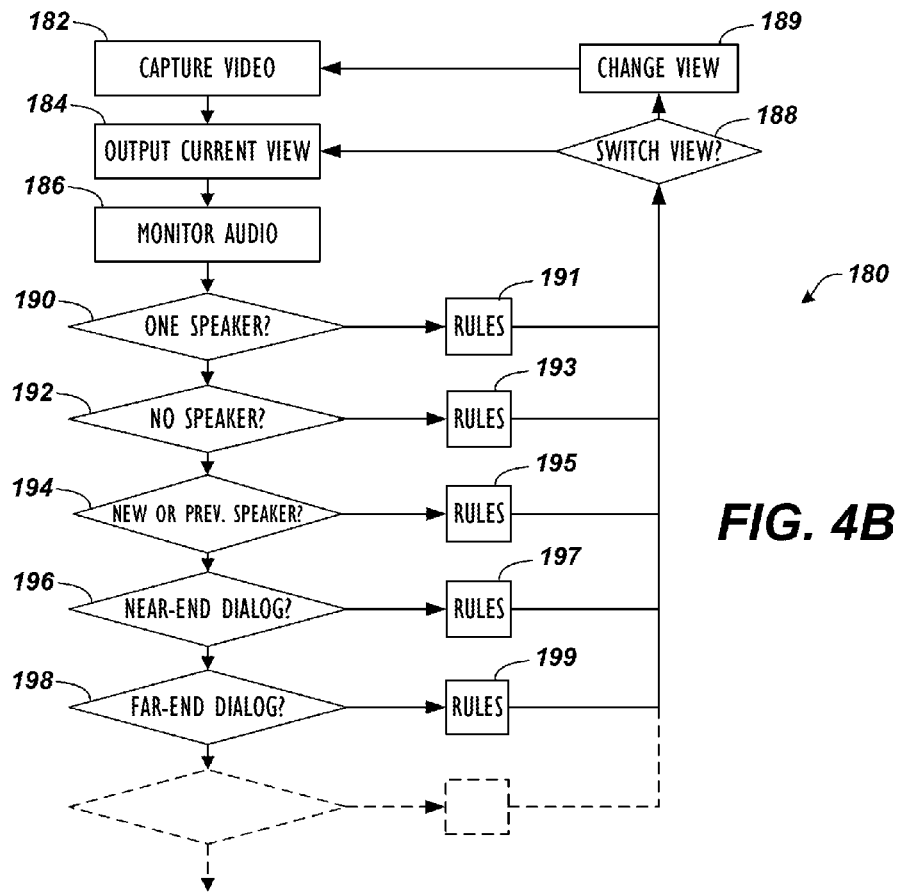
FIG. 4B illustrates a decision process for handling video based on audio cues during a videoconference.

Given this general control scheme, discussion now turns to a more detailed process 180 in FIG. 4B of the disclosed endpoint's operation during a videoconference. When a videoconference starts, the endpoint 10 captures video (Block 182) and outputs the current view for inclusion in the videoconference (Block 184). Typically, the room-view camera 50A frames the room at the start of the videoconference, and the camera 50A's pan, tilt, and zoom are preferably adjusted to include all participants if possible.

As the videoconference continues, the endpoint 10 monitors the captured audio for one of several occurrences (Block 186). As it does this, the endpoint 10 uses various decisions and rules to govern the behavior of the endpoint 10 and to determine which camera 50A-B to output for conference video. The various decisions and rules can be arranged and configured in any particular way for a given implementation. Because one decision may affect another decision and one rule may affect another, the decisions and rules can be arranged differently than depicted in FIG. 4B.

1. One Speaker

At some point in the videoconference, one of the near-end participants in the room may begin speaking, and the endpoint 10 determines that there is one definitive speaker (Decision 190). If there is one speaker, the endpoint 10 applies various rules 191 and determines whether or not to switch the current view output by the endpoint 10 to another view (Decision 188), thereby outputting the current view (Block 184) or changing views (Block 189).

With a single participant speaking, for example, the endpoint 10 directs the people-view camera 50B to frame that speaker (preferably in a "head and shoulders" close-up shot). While it moves the camera 50B, the endpoint 10 preferably outputs the wide-view from the room-camera 50A and only outputs the video from the people-view camera 50B once it has moved and framed the current speaker. Additionally, the endpoint 10 preferably requires a latency period to expire after a speaker first starts speaking before the endpoint 10 actually moves the people-view camera 50B. This can avoid frequent camera movements, especially when the current speaker only speaks briefly.

For accuracy, the endpoint 10 can use multiple algorithms to locate and frame the speaker, some of which are described in more detail herein. In general, the endpoint 10 can estimate bearing angles and a target distance of a current speaker by analyzing the audio captured with the microphone arrays 60A-B. The camera 50B's zoom factor can be adjusted by using facial recognition techniques so that headshots from the people-camera 50B are consistent. These and other techniques can be used.

2. No Speaker

At some point in the videoconference, none of the participants in the room may be speaking, and the endpoint 10 determines that there is no definitive speaker (Decision 192). This decision can be based on a certain amount of time elapsing after the last speech audio has been detected in the videoconference environment. If there is no current speaker, the endpoint 10 applies various rules 193 and determines whether or not to switch the current view output by the endpoint 10 to another view (Decision 188), thereby outputting the current view (184) or changing views (189).

For example, the current view being output may be of a zoomed-in view from the people-view camera 50B of the recently speaking participant. Although this participant has stopped speaking, the endpoint 10 may decide to keep that view or to switch to the zoomed-out view from the room-camera 50A. Deciding whether to switch views can depend on whether no other participant starts speaking within a certain period or whether a near or far-end participant starts speaking within a certain period. In other words, once a near-end participant framed in a zoomed-in view stops speaking, a participant at the far-end may start speaking for an extended time period. In this case, the endpoint 10 can switch from the zoomed-in view to a room shot that includes all participants.

3. New or Previous Speaker

At some point in the videoconference, a new or previous speaker may begin speaking, and the endpoint 10 determines that there is a new or previous speaker (Decision 194). The decision of a new or previous speaker can be based on the speech tracking from the microphone arrays 60A-B that determines the location of the different sound sources in the videoconference environment. When a source is located through tracking, the endpoint 10 can determine this to be a new or previous speaker. Alternatively, the decision of a new or previous speaker can be based voice recognition that detects characteristics of a speaker's voice.

Over time, the endpoint 10 can record locations of participants who speak in the videoconference environment. These recorded locations can be correlated to camera coordinates (e.g., pan, tilt, and zoom). The endpoint 10 can also record characteristics of the speech from located participants, the amount and number of times that a participant speaks, and other historical data. In turn, the endpoint 10 can use this historical data based on rules and decisions to determine if, when, where, and how to direct the cameras 50A-B at the participants.

In any event, the endpoint 10 applies various rules 195 and determines whether or not to switch the current view output by the endpoint 10 to another view (Decision 188), thereby outputting the current view (184) or changing views (189). For example, even though there is a new or previous speaker, the endpoint 10 may not switch to a zoomed-in view of that speaker at least until that participant has talked for a certain time period. This may avoid unnecessary jumping of the camera views between participants and wide shots.

4. Near-End Dialog

At some point in the videoconference, two or more speakers may be speaking at about the same time as one another at the near end. At this point, the endpoint 10 can determine whether a near-end dialog or audio exchange is occurring (Decision 196), For example, multiple participants at the near-end may start talking to one another or speaking at the same time. If the participants are engaged in a dialog, the endpoint 10 preferably captures video of both participants at the same time. If the participants are not engaged in a dialog and one participant is only briefly interjecting after another, then the endpoint 10 preferably maintains the current view of a dominant speaker.

In response to a near-end dialog, the people-view camera 50B can capture video by framing both speakers. Alternatively, the people-view camera 50B can capture a zoomed-in view of one speaker, while the room-view camera 50A is directed to capture a zoomed-in view of the other speaker. Compositing software of the endpoint 10 can then put these two video feeds into a composite layout for output to the far-end, or the endpoint 10 can switch between which camera's video to output based on the current speaker. In other situations when more than two participants are speaking at the near-end, the endpoint 10 may instead switch to a room-view that includes all participants.

Either way, the endpoint 10 can use a number of rules to determine when a near-end dialog is occurring and when it has ended. For example, as the videoconference progresses, the endpoint 10 can determine that a designated active speaker has alternated between the same two participants (camera locations) so that each participant has been the active speaker at least twice within a first time frame (e.g., the last 10 seconds or so). When this is determined, the endpoint 10 preferably directs the people-view camera 50B to frame both of these participants at least until a third speaker has become active or one of the two participants has been the only speaker for more than a second time frame (e.g., 15 seconds or so).

To help in the decision-making, the endpoint 10 preferably stores indications of frequent speakers, their locations, and whether they tend to talk to one another or not. If frequent speakers begin a later dialog within a certain time period (e.g., 5 minutes) after just finishing a dialog, the endpoint 10 can return directly to the previous dialog framing used in the past as soon as the second speaker starts talking in the dialog.

As another consideration, the endpoint 10 can determine the view angle between dialoging speakers. If they are separated by a view angle greater than 45-degrees or so, then directing and zooming-out the people-view camera 50B may take more time than desired to complete. In this instance, the endpoint 10 can instead switch to the room-view camera 50A to capture a wide view of the room or a framed view of the dialoging participants.

5. Far-End Dialog

At some point in the videoconference, one of the near-end participants may be having a dialog with a far-end participant, and the endpoint 10 determines that a far-end dialog or audio exchange is occurring (Decision 198) and applies certain rules (199). When a near-end speaker is engaged in a conversation with a far-end speaker, for example, the near-end speaker often stops talking to listen to the far-end speaker. Instead of identifying this situation as constituting no near-end speaker and switching to a room view, the endpoint 10 can identify this as a dialog with the far-end and stay in a current people view of the near-end participant.

To do this, the endpoint 10 can use audio information obtained from the far-end with the videoconferencing unit 95. This audio information can indicate the duration and frequency of speech audio detected from the far-end during the conference. At the near-end, the endpoint 10 can obtain similar duration and frequency of speech and correlate it to the far-end audio information. Based on the correlation, the endpoint 10 determines that the near-end participant is in a dialog with the far-end, and the endpoint 10 does not switch to the room-view when the near-end speaker stops speaking, regardless of how many other participants are in the near-end room.

E. Switching Views and Framing Speakers

As would be expected during a videoconference, the active speaker(s) may alternate dynamically among participants as they interact with one another and with the far-end. Therefore, the various decision and rules governing what video is output preferably deals with the dynamic nature of the videoconference environment in a way that avoids too much switching between camera-views and avoids showing views that have less importance or that are out of context.

Figure 5:
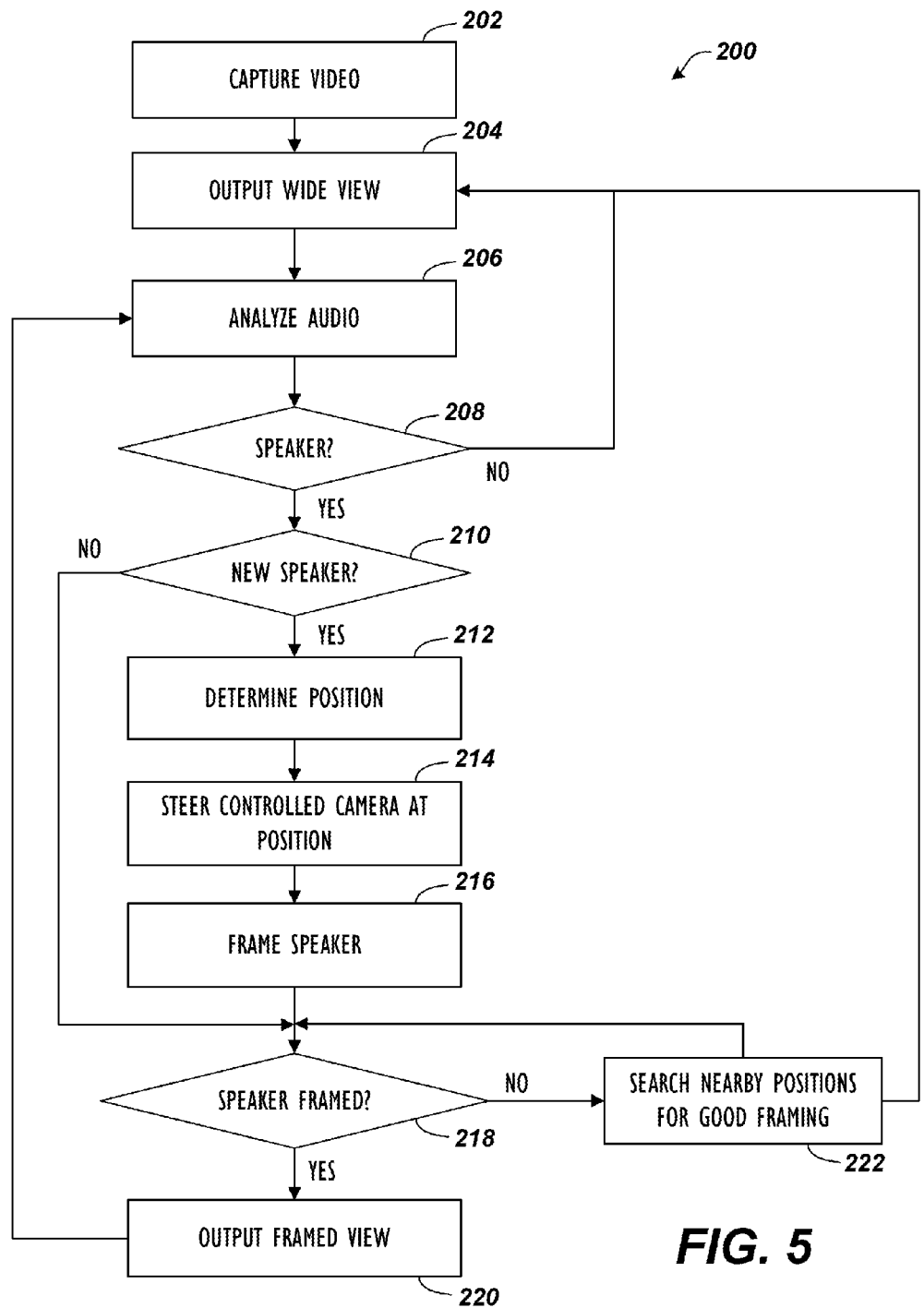
FIG. 5 illustrates a process for operating the disclosed endpoint having at least two cameras.

Turning now to FIG. 5, a process 200 provides further details on how the endpoint 10 switches between views and frames active speakers. Operation begins with the endpoint 10 capturing video using one or both cameras 50A-B (Block 202). When no participant is speaking, the endpoint 10 can use the wide view from the room-view camera 50A and can output this video, especially at the start of the videoconference (Block 204).

As the videoconference proceeds, the endpoint 10 analyzes the audio captured with the microphones 28 and/or arrays 60A-B (Block 206) and determines when one of the participants is speaking (Decision 208). This determination can use processing techniques known in the art for detecting speech based on its recognizable characteristics and locating a source through tracing. Once a participant begins speaking (Decision 208), the endpoint 10 determines whether this is a new speaker (Decision 210). This would naturally be the case if the videoconference just started. During later processing, however, the endpoint 10 can determine that the person speaking is a new speaker based on speaker recognition outlined below or based on a comparison of whether the location of the last speaker in an analyzed block is different from a current estimation of the present speaker.

If a new speaker is determined (or processing is needed for any other reason), the endpoint 10 determines the location of the speaker (Block 212) and steers the people-view camera 50B towards that determined location (Block 214). A number of techniques can be used to determine the location of a speaker relative to the people-view camera 50B. Some of these are described below.

In one example, the endpoint 10 processes the audio signals from the various microphone arrays 60A-B and locates the active speaker using techniques for locating audio sources. Details of these techniques are disclosed in U.S. Pat. Nos. 5,778,082; 6,922,206; and 6,980,485, which are each incorporated herein by reference. In another example, speaker recognition techniques and historical information can be used to identify the speaker based on their speech characteristics. Then, the endpoint 10 can steer the camera 50B to the last location associated with that recognized speaker, as long as it at least matches the speaker's current location.

Once the speaker is located, the endpoint 10 converts the speaker's candidate location into camera commands (pan-tilt-zoom coordinates) to steer the people-view camera 50B to capture the speaking participant (Block 214). Once moved, the active speaker is framed in the camera's view (Block 216).

Because there may be challenges to framing the speaker, the endpoint 10 determines if the active speaker is framed properly in the current view (Decision 218). If not, the endpoint 10 searches the active view and/or adjacent portions of the camera's view to adjust the view to frame the actual physical location of the speaker, which may be different from the location determined through speech tracking (Block 220). Adjusting the view can be repeated as many times as needed. Ultimately, if the speaker's location cannot be determined or the speaker cannot be properly framed, the endpoint 10 may continue showing the wide-view from the room-view camera 50A (Block 204) rather than switching to the people-view camera 50B.

Several techniques are disclosed herein for determining if the current view of the people-view camera 50B properly frames the current speaker. For example, once the people-view camera 50B is done steering, the endpoint 10 can use a motion-based video processing algorithm discussed below to frame the speaker. If the algorithm reports good framing (Decision 218), the endpoint 10 switches from the wide view (provided by room-view camera 50A) to the directed view (provided by the people-view camera 50B) and selects the current view from this camera 50B for output to remote endpoints (Block 220). If good framing is not reported, then the position of the people-view camera 50B is fine-tuned to continue searching for good framing (Block 222). If good framing still cannot be found, the endpoint 10 keeps the wide view of the room-view camera 50A (Block 204).

1. Audio Tracking Details

Figure 6A:
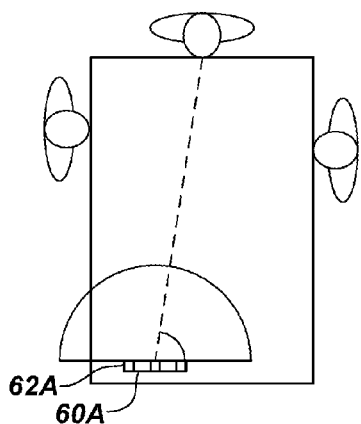
FIGS. 6A-6B illustrate plan and side views of locating a speaker with the microphone arrays of the disclosed endpoint.
Figure 6B:
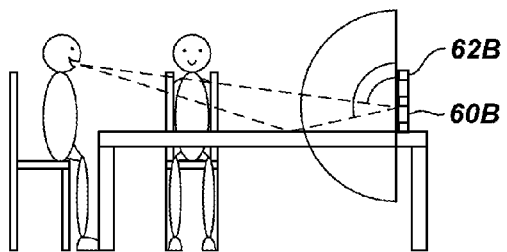

As noted above, locating a speaker and directing the people-view camera 50B uses the microphones 62A-B of the orthogonally arranged arrays 60A-B. For example, FIG. 6A shows a plan view of the horizontal array 60A in a videoconference environment, while FIG. 6B shows an elevational view of the vertical array 60B. The endpoint 10 uses the horizontal array 60A to determine the horizontal bearing angle of a speaker and uses the vertical array 60B to determine the vertical bearing angle. Due to positional differences, each microphone 62A-B captures an audio signal slightly different in phase and magnitude from the audio signals captured by the other microphones 62A-B. Audio processing of these differences then determines the horizontal and vertical bearing angles of the speaker using beam forming techniques as disclosed in incorporated U.S. Pat. Nos. 5,778,082; 6,922,206; and 6,980,485.

Briefly, for a plurality of locations, audio processing applies beam-forming parameters associated with each point to the audio signals sent by the microphone arrays 60A-B. Next, audio processing determines which set of beam forming parameters maximize the sum amplitude of the audio signals received by the microphone arrays 60A-B. Then, audio processing identifies the horizontal and vertical bearing angles associated with the set of beam forming parameters that maximize the SLAM amplitude of microphone arrays' signals. Using these horizontal and vertical bearing angles, the audio processing ultimately determines the corresponding pan-tilt-zoom coordinates for the people-view camera 50B.

Depending on the dynamics of the environment, there may be certain challenges to framing the current speaker with the people-view camera 50B based on source tracking with the arrays 60A-B. As noted previously, reflections off surrounding objects may cause the camera 50B to direct improperly toward a reflection of a sound source so that the speaker is not properly framed in the camera's view.

As shown in FIG. 6B, for example, reflections complicate the correct determination of a pan coordinate because audio may reflect off a reflection point (e.g., the tabletop). To the microphone array 60B, the reflection point looks as though it is directed from an audio source. If more sound energy is received from the direction of this reflection point than from the direction of the speaking participant, then the endpoint 10 may improperly determine the reflection as the sound source to be tracked.

Figure 7A:
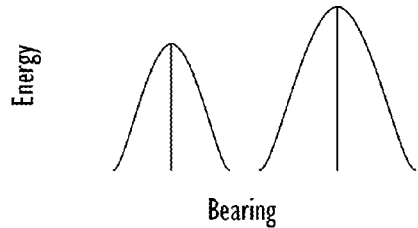
FIGS. 7A-7B graph sound energy versus bearing angle in locating a speaker.
Figure 7B:
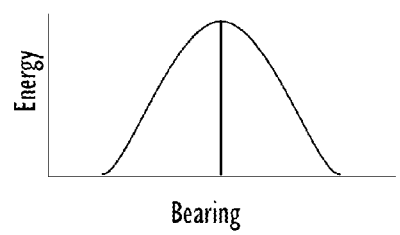

To overcome this, the endpoint 10 can use detection techniques that recognize such reflections. As shown in FIGS. 7A-7B, for example, energy detected by one of the arrays 60A-B is graphed relative to bearing angle. As can be seen in FIG. 7A, sound from a source and a reflection from the source produces two energy peaks, one for the source and another for the reflection (usually later). This contrasts to the graph in FIG. 7B where there is no reflection. Analyzing the energy relative to bearing angles, the endpoint 10 can determine that there is a reflection from a source and ignore it. In the end, this can help avoid directing the people-view camera 50B at a reflection point.

In a similar problem to reflection, locating speakers and framing them with the cameras 50A-B may be complicated by other noises occurring in the videoconference environment. Noise from keyboard typing, tapping of pencils, twisting of chairs, etc. can be mixed with speech from participants. For example, participants may bring laptops to the videoconference and may reply to e-mails, take notes, etc. Because captured audio at a given time may contain speech interspersed with this noise (such as typing), the speech detector 43 of the audio based locator 42 may need to deal with such extraneous noises.

As noted previously, the endpoint 10 uses the speech detector 43 (FIG. 1A) to determine if the signal captured by the microphone arrays 24 is speech or non-speech. Typically, the speech detector 43 can work effectively when the signal is either speech or keyboard noise, and the endpoint 10 just ignores captured audio when the speech detector 43 detects the audio as non-speech. However, the speech detector 43 can be less effective when speech and noise are mixed. If an error occurs, the endpoint 10 may direct the people-view camera 50B at the source of noise (e.g., keyboard) by mistake.

Several benefits of the disclosed endpoint 10 help deal with speech mixed with extraneous noise. As noted previously, the endpoint 10 preferably moves the cameras 50A-B infrequently to eliminate excessive view switching. To that end, the endpoint 10 preferably uses a latency period (e.g., 2-seconds) before sending a source's position to the cameras 50A-B. Accordingly, the endpoint 10 can accumulate two seconds of captured audio from the microphone arrays 60A-B before declaring a source's position to the people-view camera 50B. Keyboard noise and speech will not overlap over the entire latency period (2-seconds), and the time interval between two consecutive keyboard typing actions is typically at least 100-ms for most people. For this reason, the latency period of 2-seconds can be sufficient, although other time periods could be used.

Figure 8B:
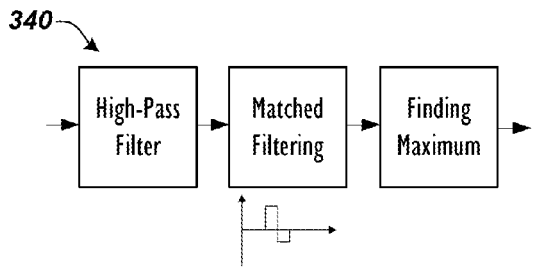
FIG. 8B shows a block diagram of a transient signal detector according to the present disclosure for handling speech and noise.
Figure 8C:
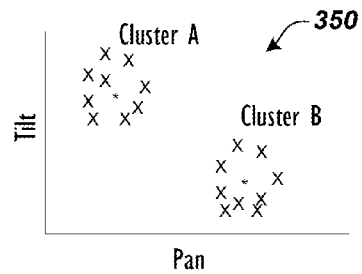
FIG. 8C shows clustering of pan-tilt coordinates for handling speech and noise.
Figure 8A:
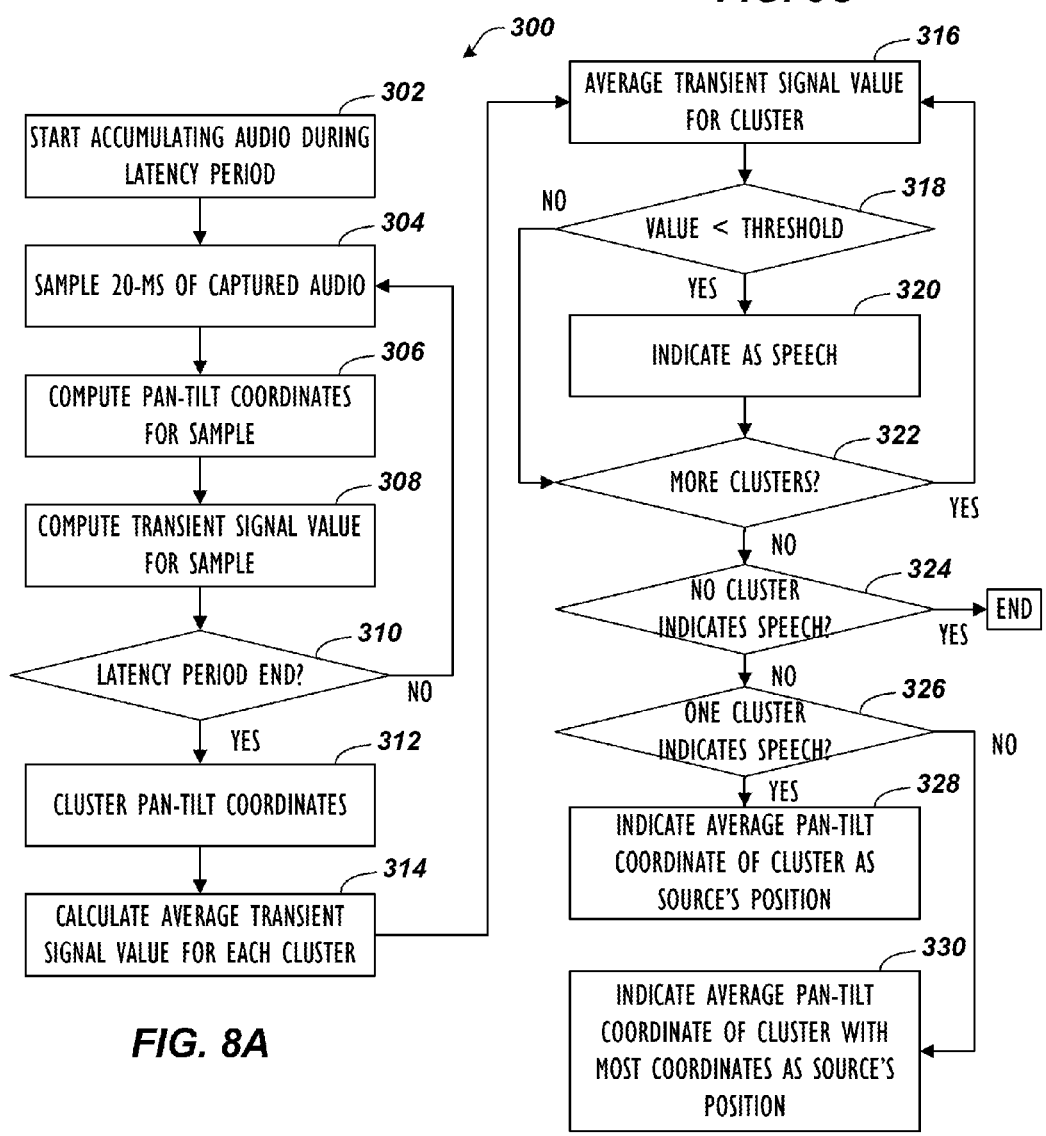
FIG. 8A shows a process for handling speech and noise detected in audio captured by the microphone arrays.

FIG. 8A shows a process 300 for handling speech and non-speech audio in the speech detection. In one implementation, the endpoint 10 starts accumulating audio captured by the microphone arrays 60A-B in a latency period (Block 302) by sampling the captured audio every 20-ms (Block 304). The endpoint 10 uses these 20-ms samples to compute the sound source's pan-Lilt coordinates based on speech tracking techniques (Block 306). Yet, these pan-tilt coordinates are not passed to the people-view camera 50B as the source's position. Instead, the endpoint 10 processes the 20-ms samples in a number of steps to differentiate source positions caused by speech and/or noise.

In addition to computing the pan-Lilt coordinates for the purported source in the 20-ms samples, the endpoint 10 uses a Transient Signal Detector (TSD) to calculate transient signal values for each of the 20-ms samples (Block 308). FIG. 8B shows a block diagram of a transient signal detector 340. As shown, the detector 340 has a 4000-Hz high-pass filter that filters out frequencies below 4000-Hz. After the high-pass filter, the detector 340 has a matched filter (the shape of the matched filter is shown beneath the block) used for correlating a template signal of the matched filter to the unknown signal of the 20-ms sample. For every 20-ms sample, the output of the detector 340 is a scalar number, i.e., the maximum in the matched-filtering output.

Based on this transient signal processing, the resulting value from the detector 340 can indicate whether the 20-ms sample is indicative of speech or non-speech. If the detector 340 generates a large transient signal value, for example, then the 20-ms sample likely corresponds to keyboard noise. If the detector 340 generates a small transient signal value, then the 20-ms sample likely corresponds to speech. Once the transient signal values are generated, they are associated with the pan-tilt coordinates of the 20-ms samples.

By the end of the 2-second latency period (Decision 310 in FIG. 8A), there can be as many as 100 of the 20-ms samples having pan-tilt coordinates and transient signal values. (Those samples that only have background noise will not produce valid coordinates.) Using clustering techniques, such as a Gaussian Mixture Model (GMM) algorithm, the endpoint 10 clusters the pan-tilt coordinates for the 20-ms samples (Block 312), finds the number of clusters, and averages the values for each cluster (Block 314). Other clustering techniques, such as the Linde-Buzo-Gray (LBG) algorithm, can also be used.

For example, FIG. 8C shows results after clustering pan-tilt coordinates of 20-ms samples during a latency period. Each pan-tilt coordinate is indicated by an "x," and the mean value of each duster (i.e., the sound source's position) is indicated by an "*." In this example, the clustering shows two sound sources grouped together in two clusters.

These clusters have different pan and tilt coordinates, presumably because the two sources are in separate parts of the videoconferencing environment. Yet, even if a speaker is speaking while also typing, the clustering can differentiate the dusters by their different tilt coordinates even though the dusters have the same pan coordinate. In this way, the endpoint 10 can locate a speech source for directing the people-view camera 50B even when a participant is typing and speaking simultaneously.

Once clustering has been completed as described above, the endpoint 10 in the process 300 of FIG. 8A calculates the average of the transient signal values for each determined duster (Block 316). If the average transient signal value for a duster is less than a defined threshold (Decision 318), then the endpoint 10 declares the cluster as likely corresponding to speech (Block 320). Otherwise, the endpoint 10 declares the duster as a transient sound, such as from keyboard typing noise. The value of the threshold and other variable depends on the type of noise to be reviewed (e.g., keyboard typing) as well as the output of the matched filtering from the transient signal detector 340. Accordingly, the particular values for these variables can be configured for a given implementation.

Once all the clusters' averages have been compared to the threshold, the endpoint 10 determines whether none of the clusters indicates speech (Decision 324) and ends if none do. If only one duster indicates speech, then the endpoint 10 can readily determine that this duster with its average pan-tilt coordinates corresponds to the speech source's position (Block 328). If more than one duster indicates speech (Decision 326), then the endpoint 10 declares the duster with the most pan-tilt coordinates as the speech source's position (Block 330).

Accordingly, the clustering shown in FIG. 8C can have four possible results as follows: (1) Cluster A can be speech while Cluster B can be noise, (2) Cluster A can be noise while Cluster B can be speech, (3) Cluster A can be speech while Cluster B can be speech, (4) Cluster A can be noise while Cluster B can be noise, Although FIG. 8C shows two dusters in this example, the endpoint 10 can be expanded to operate on any number of speech and noise sources.

In this example of FIG. 8C, the endpoint 10 can readily determine which cluster A or B corresponds to the speech source in the first and second combinations. In these situations, the endpoint 10 can transmit the sound source's position (the average pan-tilt coordinate for the speech cluster) to the people-view camera 50B at the end of 2-second latency period so the camera 50B can be directed at the source if necessary.

If the third combination occurs where both dusters A and B indicate speech, the endpoint 10 uses the number of pan-tilt coordinates "x" in the dusters to determine which duster represents the dominant speaker. Thus, the duster having the most pan-tilt coordinates computed for the 20-ms samples during the latency period can be declared the source's position. With the fourth combination where neither duster indicates speech, the speech detector 43 of the endpoint 10 may already indicate that the detected sounds are all (or mostly) noise.

As can be seen above, the endpoint 10 uses the latency period to detect if speech and/or noise is being captured by the microphone arrays 60A-B. Ultimately, through the filtering for the transient signals values and clustering of coordinates, the endpoint 10 can determine which pan-tilt coordinate likely corresponds to a source of speech. In this way, the endpoint 10 is more likely to provide more reliable source position information to direct the people-view camera 50B during operation.

2. Framing Details

To overcome problems with incorrect bearing determinations, the endpoint 10 can also use motion-based techniques and other techniques disclosed herein for automated framing of the speaker during the conference. Moreover, the endpoint 10 can have configurable no shot zones in a camera's view. In this way, users can define sections in the camera's field of view where the camera 50A-B is not to be directed to capture video. Typically, these no-shot sections would be areas in the field of view where table, walls, or the like would be primarily captured.

Figure 9A:
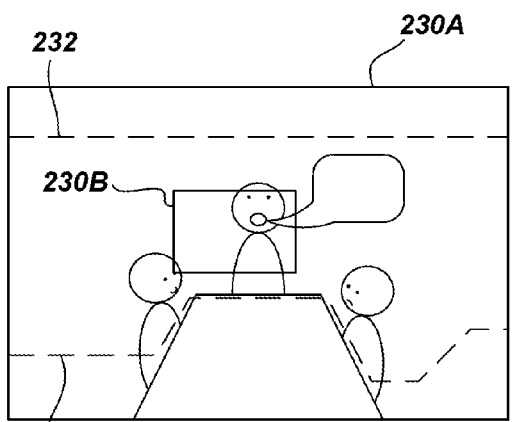
FIGS. 9A-9B illustrate framed views when locating a speaker with the disclosed endpoint.
Figure 9B:
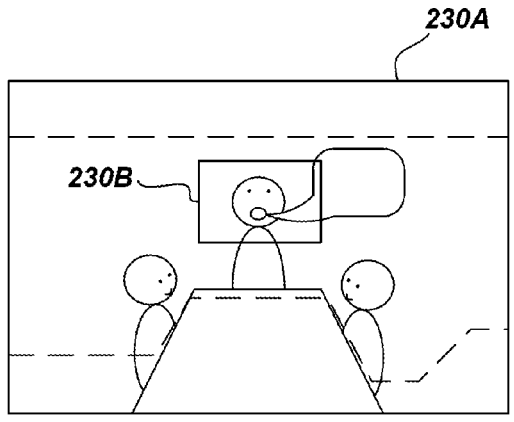

Turning to FIGS. 9A-9B, a wide view 230A from the room-view camera (50A) is shown. In addition, a tight view 230B from the people-view camera (50B) is shown being framed around a videoconference participant after first framing around an incorrect bearing determination. For reference, no shot zones 232 have been defined in the wide-view 230A. These zones 232 may be implemented in a calibration of the endpoint (10) for a particular room and may not change from conference to conference.

In FIG. 9A, the people-view camera (50B) has aimed at the videoconference participant in the tight view 230B after starting to speak. Due to some error (i.e., reflection, speaker facing away, etc), the tight view 230B does not properly frame the participant. To verify proper framing, the endpoint (10) searches for characteristics in the captured video of the tight view 230B such as motion, skin tone, or facial features.

To detect motion, the endpoint (10) compares sequentially sampled frames from the video of the tight view 230B captured by the people-view camera (50B) and identifies differences due to movement. As discussed in more detail below, for example, the endpoint (10) can determine movement by summing luminance values of pixels in a frame or a portion of a frame and compare the sums between sequential frames to one another. If the difference between the two sums is greater than a predetermined threshold, then the frame or portion can be marked as an area having motion. Ultimately, the tight view 230B can then be adjusted or centered about this detected motion in an iterative process.

For example, the people-view camera 50B may frame a speaker in a tight view 230B that is too high or low or is too right or left. The aim of the camera 50B is first adjusted based on motion pixels. If the camera 50B points too high on a speaker (i.e., the head of the speaker is shown on the lower half of the view 230B), the camera's aim is lower based on the motion pixels (i.e., the uppermost motion block found through processing).

If there are no motion blocks at all associated with the current tight view 230B framed by the camera 50B, then the endpoint (10) can resort to directing at a second sound peak in the audio captured by the arrays 60A-B. If the current camera (i.e., people-view camera 50B) has automatic features (e.g., auto-focus, auto gain, auto iris, etc.), the endpoint 10 may disable these features when performing the motion detection described above. This can help the motion detection work more reliably.

As an alternative to motion detection, the endpoint (10) detects skin tones in the video of the tight view 230B using techniques known in the art. Briefly, the endpoint (10) can take an average of chrominance values within a frame or a portion of a frame. If the average is within a range associated with skin tones, then the frame or portion thereof is deemed to have a skin tone characteristic. Additionally, the endpoint (10) can use facial recognition techniques to detect and locate faces in the camera's view 230B. For example, the endpoint (10) can find faces by finding regions that are likely to contain human skin, and then from these, regions that indicate the location of a face in view. Details related to skin tone and facial detection (as well as audio locating) are disclosed in U.S. Pat. No. 6,593,956 entitled "Locating an Audio Source," which is incorporated herein by reference. The tight view 230B can then be adjusted or centered about this detected skin tone and/or facial recognition in an iterative process.

In verifying the framing, the endpoint (10) can use both views 230A-B from the cameras (50A-B) to analyze for characteristics such as motion, skin tones, or faces. The wide view 230B from the people-view camera (50B) can be analyzed for motion, skin tones, or faces to determine whether it is currently directed at a participant. Should the people-view camera (50B) end up pointing at a wall or the ceiling, for example, then video processing for motion, skin tones, or faces in the tight view 230B can determine that this is the case so the endpoint (10) can avoid outputting such an undesirable view. Then, the people-view camera (50B) can be steered to surrounding areas to determine if better framing can be achieved due to greater values from subsequent motion, skin tone, or facial determinations of these surrounding areas.

Alternatively, the wide view 230A from the room-view camera 50A can be analyzed for motion, skin tone, or facial determinations surrounding the currently framed view 230B obtained through speech tracking. If greater values from motion, skin tone, or facial determinations of these surrounding areas are found in the wide view 230A, then the endpoint (10) can steer the people-view camera (50B) toward that surrounding area. Knowing the set distance between the two cameras (50A-B) and the relative orientations of their two views, the endpoint (10) can convert the regions between the views 230A-B into coordinates for moving the people-view camera (50B) to frame the appropriate region.

How surrounding areas are analyzed can involve zooming the people-view camera (50B) in and out to change the amount of the environment being framed. Then, video processing can determine differences in motion, skin tone, or facial determinations between the different zoomed views. Alternatively, the pan and/or tilt of the people-view camera (50B) can be automatically adjusted from an initial framed view 230B to an adjusted framed view. In this case, video processing can determine differences in motion, skin tone, or facial determinations between the differently adjusted views to find which one better frames a participant. In addition, each of the motion, skin tone, or facial determinations can be combined together, and combinations of adjusting the current framing of the people-view camera (50B) and using the room-view camera (50A) can be used as well.

Finally, the framing techniques can use exchanged information between the people-view camera (50B) and the room-view camera (50A) to help frame the speakers. The physical positions of the two cameras (50A-B) can be known and fixed so that the operation (pan, tilt, zoom) of one camera can be directly correlated to the operation (pan, tilt, zoom) of the other camera. For example, the people-view camera (50B) may be used to frame the speaker. Its information can then be shared with the room-view camera (50A) to help in this camera's framing of the room. Additionally, information from the room-view camera (50A) can be shared with the people-view camera (50B) to help better frame a speaker.

Using these framing techniques, the videoconferencing endpoint 10 reduces the likelihood that the endpoint 10 will produce a zoomed-in view of something that is not a speaker or that is not framed well. In other words, the endpoint 10 reduces the possibility of improperly framing (such as zooming-in on conference tables, blank walls, or zooming-in on laps of a speaker due to imperfect audio results generated by the microphone arrays) as can occur in conventional systems. In fact, some conventional systems may never locate some speakers. For example, conventional systems may not locate a speaker at a table end whose direct acoustic path to the microphone arrays 60A-B is obscured by table reflections. The disclosed endpoint 10 can successfully zoom-in on such a speaker by using both the video and audio processing techniques disclosed herein.

F. Auto-Framing Process

As noted briefly above, the disclosed endpoint 10 can use motion, skin tone, and facial recognition to frame participants properly when dynamically directing the people-view camera 50B to a current speaker. As part of the framing techniques, the disclosed endpoint 10 can initially estimate the positions of participants by detecting relevant blocks in captured video of the room at the start of the videoconference or at different intervals. These relevant blocks can be determined by looking at motion, skin tone, facial recognition, or a combination of these in the captured video. This process of auto-framing may be initiated by a videoconference participant at the start of the conference or any other appropriate time. Alternatively, the auto-framing process may occur automatically, either at the start of a videoconference call or at some other triggered time. By knowing the relevant blocks in the captured video corresponding to participants' locations, the endpoint 10 can then used these known relevant blocks when automatically framing participants around the room with the cameras 50A-B.

FIG. 10 shows a process 400 for using auto-framing according to the present disclosure. This process 400 is discussed below for a dual camera system, such as disclosed in FIGS. 1A and 2A. However, the auto-framing techniques are equally useful for a videoconferencing system having one camera, such as disclosed in FIGS. 2B and 2D.

At initiation before a videoconference starts (i.e., as calls are being connected and participants are getting prepared), the endpoint 10 starts a time period (Block 402) and samples video captured by one of the cameras (Block 404). To do this, the endpoint 10 obtains video of the entire room by zooming a camera all the way wide, or the endpoint 10 may directly know the full pan-tilt-zoom range of the camera for the widest view of the environment. After obtaining the wide view of the room, the endpoint 10 then segments the wide view into blocks for separate analysis (Block 406). In other words, the default wide view of the room space of interest is "divided" into a plurality of sections or blocks (N=2, 3, etc). Each of these blocks represents a particular tight view of the camera. In this way, the blocks can be identified as a particular pan, tilt, and zoom coordinate of the camera.

Having the dual cameras 50A-B, the endpoint 10 can zoom either one or both of the cameras 50A-B wide to obtain the overall wide view. Preferably, the people-camera 50B, which is steerable, is used so the people-view camera 50B can obtain the widest possible view of the environment. As noted previously, the full range of pan, tilt, and zoom of this camera 503 may already be known to the endpoint 10. Accordingly, the endpoint 10 can automatically segment the widest possible view into a plurality of blocks or tight views, each represented by a particular pan, tilt, and zoom coordinate of the camera 50B.

Figure 12A:
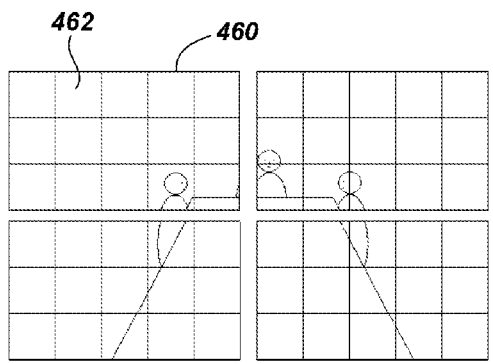
FIGS. 12A-12C illustrate various views during auto-framing with the disclosed endpoint.

Alternatively, the people-view camera 50B can obtain several video images separately at different directions and piece them together to create a wide view of the room. For example, FIG. 12A shows four captured images 460 of the quadrants of a videoconference environment obtained with the people-view camera 50B. To obtain the images 460, the people-view camera 50B can be zoomed wide and panned to various quadrants to get the widest possible view of the room. This can increase the searching area. Although no overlap is shown between images 460, they may overlap in practice, although this can be properly handled through processing.

Each image 460 is shown divided into several blocks 462 (fifteen in this example, but other values could be used). The blocks 462 are at least as large as one pixel and may be the size of macroblocks commonly used by video compression algorithms. Again, each of these blocks 462 correlate to a particular pan, tilt, and zoom coordinate of the camera 503, which can be determined by the given geometry.

With the wide view of the room divided into blocks in FIG. 10, the endpoint 10 selects each block (Block 408) and reviews each block to determine the block's relevance for auto-framing purposes. To review each block 462, the people-view camera 50B is zoomed-in to a tight view encompassing the block to determine what relevance (i.e., motion, skin tone, facial recognition, etc.) this block has in the overall view of the room (Block 410). Being zoomed-in, the video images obtained with the people-view camera 503 can better detect motions, skin tone, and other details.

Accordingly, the endpoint 10 determines if the zoomed-in image from the selected block is relevant (Decision 412). If a block is determined relevant, then the endpoint 10 marks this block as relevant (Block 414) and stores its associated position information (camera pan, tilt, and zoom coordinates) in memory for later use.

Relevant blocks are important because they define areas of interest for properly framing views with the cameras 50A-B when dynamically needed during the videoconference. In other words, the relevant blocks contain a portion of the view having a characteristic indicating it to be at least a portion of a subject of interest to videoconference participants. Often, in a videoconference, participants are the subjects of interest. In such a case, searchable characteristics indicative of videoconference participants can include motion, skin tone, and facial features as noted previously.

After review of all of the blocks (Decision 416) and determining if the time period has ended (Decision 418), video processing determines the outer-most relevant blocks (Block 420). These can include the left-most, right-most, and top-most relevant blocks. The bottom-most relevant blocks may be ignored if desired. From such outer-most blocks, the endpoint 10 calculates pan-tilt-zoom coordinates for framing the best-fit view of the participants in the environment (Block 422). For example, the positions of the left-most, right-most and top-most relevant blocks can be converted into the pan-tilt-ZOOM coordinates for auto-framing using triangular calculations and the block-camera position data stored in memory.

Figure 12B:
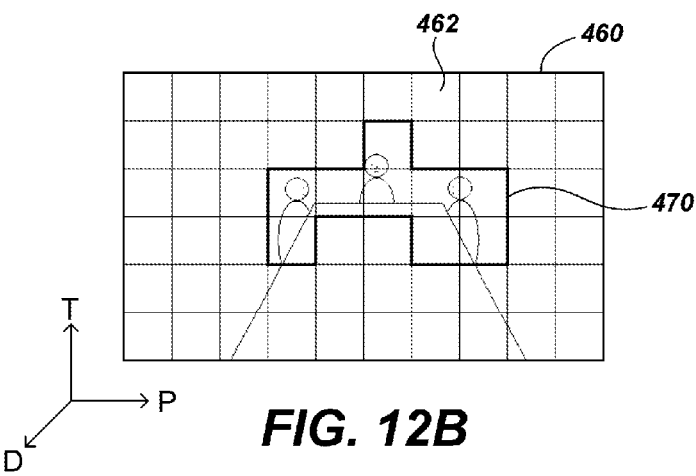
Figure 12C:
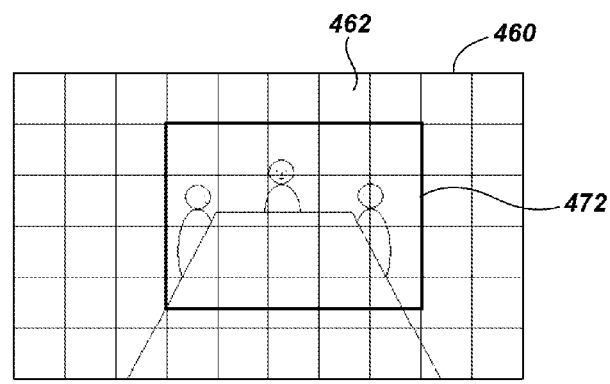

Finally, the endpoint 10 frames the room based on the composite results obtained from the analyzed blocks. For illustration, FIG. 12B shows a framed area 470 of relevant blocks 462 in a wide-angle view 460. After considering the left-most, right-most, and top-most relevant blocks 462 in the area 470, FIG. 12C then shows the resulting framed view 472 in the wide-angle view 460. By knowing the best view 472, the endpoint (10) can adjust pan-tilt-zoom coordinates of the room-view camera (50A) to frame this view 472 so that superfluous portions of the videoconferencing room are not captured. Likewise, the speech tracking and auto-framing of participants performed by the endpoint (10) for the people-view camera (50B) can be generally restricted to this framed view 472. In this way, the endpoint (10) can avoid directing at source reflections outside the framed view 472 and can avoid searching adjacent areas surrounding a speaking participant outside the framed view 472 when attempting to frame that participant properly.

1. Auto-Framing Using Motion

Figure 11A:
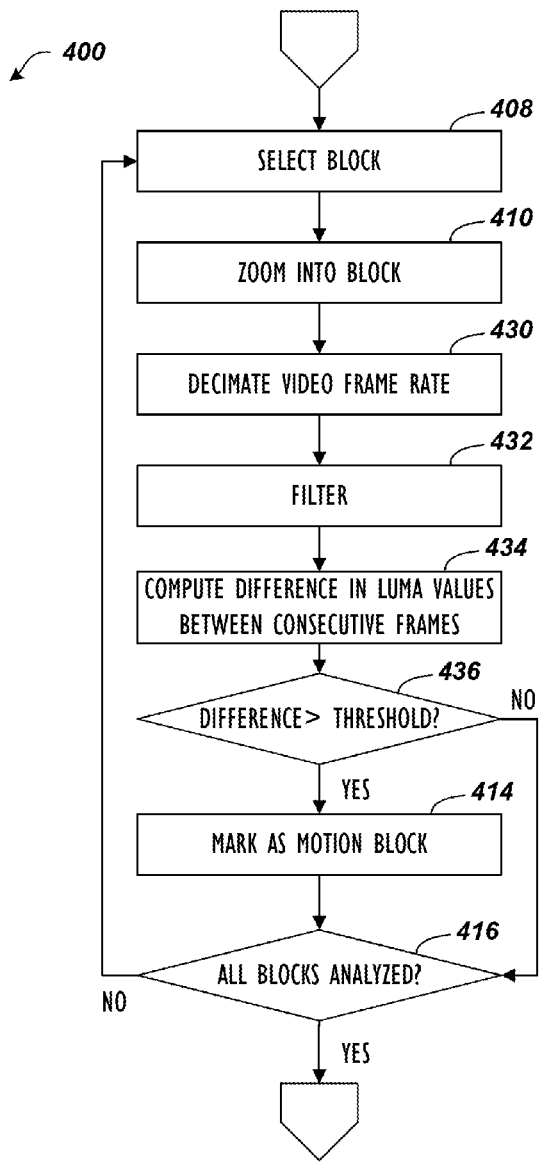
FIGS. 11A-11C illustrate various processes for determining relevant blocks for auto-framing.

Determining a block as relevant can use several techniques as noted above. In one embodiment shown in FIG. 11A, video processing identifies relevant blocks by determining which blocks indicate participants moving. As shown, video processing selects a block (Block 408) and zooms-in on it with a tight view (Block 410) as discussed previously. Then, the video processing decimates the video frame rate captured by the zoomed-in camera 50B of the selected block to reduce the computational complexity. For example, the frame rate may be decimated to about six frames per second in one implementation. At this point or any other point, temporal and spatial filtering can be applied to improve detection and remove noise or interference.

Using consecutive frames, the video processing sums luminance values of pixels within one of the block's frames and compares this value to the sum of luminance values within another of the block's frames (Block 434). If the difference between the two sums is greater than a predetermined threshold (Decision 436), then video processing marks the subject block as relevant and potentially containing motion (Block 414).

Finally, the difference in luminance values between the consecutive frames is then calculated on a block-by-block basis until all of the blocks have been analyzed (Decision 416). Once done, the endpoint 10 has determined which of the blocks are relevant based on motion. At this point, the endpoint 10 continues with the process steps in FIG. 10 to auto-frame the wide view of the room based on the relevant blocks.

Figure 13:
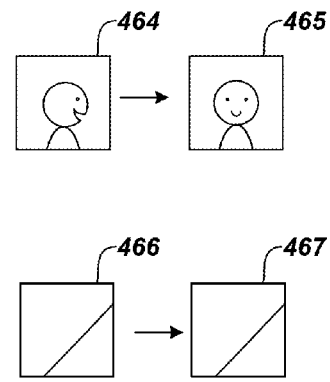
FIG. 13 illustrates blocks being analyzed for motion detection.

For illustration, FIG. 13 shows a first frame 464 of a block with a participant in a first position and shows a subsequent frame 465 of the block with the participant has moved. The motion-based technique discussed above averages luminance for these two frames 464/465 and compares them. If the difference in luminance is greater than a threshold, then the block associated with these frames 464/465 is determined a relevant motion block that can be designated as part of the framed view.

By contrast, frames 4661467 show a portion of the videoconference room that remains static. When the luminance averages are compared between these frames 466/467, the difference falls below the threshold so that the block associated with these frames 466/467 will not be determined relevant.

The threshold for the difference in luminance may depend on the cameras used, the white balance, the amount of light, and other factors. Therefore, the threshold can be automatically or manually configurable. For example, the endpoint 10 can employ a low threshold to detect relevant blocks based on conscious and unconscious motions of videoconference participants. When the video processing uses such a low threshold, it can have a higher sensitivity to motion. Conversely, as the threshold increases, the endpoint's sensitivity to motion decreases. Thus, the minimum threshold necessary to locate videoconference participant engaged in speaking is higher than the minimum threshold necessary to locate videoconference participants exhibiting merely passive motion. Therefore, by adjusting the threshold, the video processing can detect a videoconference participant while he is speaking and avoid detecting when he is sitting passively. For these reasons, any thresholds involved in motion detection can be configurable and automatically adjustable during operation.

2. Auto-Framing Using Skin Tone

Figures 11B, 11C:
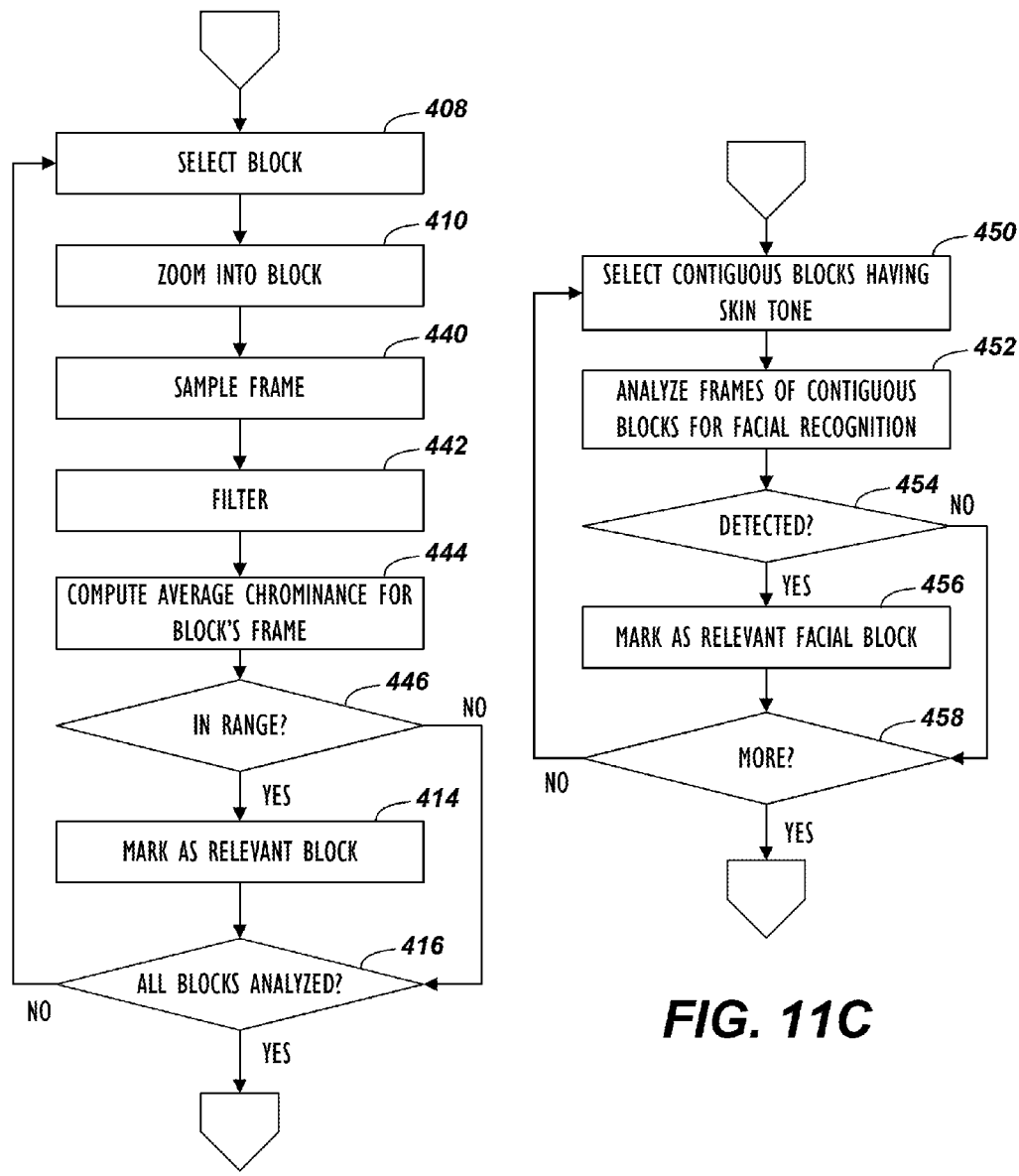

In another embodiment shown in FIG. 11B, video processing determines relevant blocks based on whether their pixels contain skin tones, Many methods are known in the art for finding skin tones within an image. In this example, video processing selects a block (Block 408) and zooms-in on it in a tight view (Block 410) as before. Then, the video processing samples one or more frames of the capture video of the block or portions thereof (Block 440), filters it if desired (Block 442), and computes an average of chrominance value within the subject block (Block 444). If the average is within a range associated with human skin tone (Decision 446), then the block is marked as relevant (Block 414).

Details related to skin tone detection are disclosed in incorporated U.S. Pat. No. 6,593,956. Skin tone detection can depend on a number of factors and can also be manually and automatically configurable. In any event, the average chrominance values are calculated on a block-by-block basis until all of the blocks have been analyzed for relevance (Decision 416). At this point, the endpoint 10 continues with the process steps in FIG. 10 to auto-frame the wide view of the room based on the relevant blocks.

G. Auto-Framing Using Facial Recognition

In yet another embodiment shown in FIG. 11C, video processing can use facial recognition to determine relevant blocks. Many methods are known in the art for recognizing facial features. Details related to facial detection are disclosed in incorporated U.S. Pat. No. 6,593,956. In this example, the video processing selects contiguous blocks already analyzed and marked as having skin tones (Block 450). A facial recognition algorithm then analyzes the contiguous set of blocks for facial features (Block 452). If detected (Decision 454), this set of contiguous blocks are marked as relevant facial blocks that can be used for later auto-framing (Block 456).

Finally, all the contiguous blocks are analyzed for facial recognition on a set-by-set basis until all of the blocks have been analyzed (Decision 416). At this point, the endpoint 10 continues with the process steps in FIG. 10 to auto-frame the wide view of the room based on the relevant blocks.

H. Additional Auto-Framing Details

During operation, the endpoint 10 may need to reframe a current view obtained by one or both of the cameras (50A-B) if conditions within the view change. For example, a videoconference participant may leave the view during a videoconference, or a new participant may come into the room. The endpoint 10 can periodically re-scan the wide view to discover any changes (i.e., any new or old relevant blocks). When re-scanning, the video processing can locate those blocks containing participants or lacking such so they can be considered in recalculating pan-tilt-zoom coordinates for the camera views. Alternatively, a videoconference participant can initiate a reframing sequence using a user interface or remote control.

For rescanning, using the endpoint 10 having at least two cameras 50A-B can be particularly beneficial. For example, in the dual camera endpoint 10, the people-view camera 50B can rescan the overall wide view of the room periodically with the process of FIG. 10, while the room-view camera 50A captures and outputs the conference video. Alternatively, as the people-view camera 50B tracks and zooms-in on current speakers, the room-view camera 50A may initiate a rescan procedure to determine relevant blocks in the wide view.

Although these framing techniques are beneficial to the dual camera endpoint 10 disclosed previously, the techniques can also be used in a system having single camera device, such as disclosed in FIGS. 2B and 20. Moreover, these framing techniques can be used with a system having microphone arrays as disclosed previously or with any other arrangement of microphones.

I. Speaker Recognition

In addition to or as an alternative to speech tracking, motion, skin tone, and facial recognition, the endpoint 10 can use speaker recognition to identify which particular participant is speaking in the videoconference environment. The speaker recognition techniques can be used with the dual camera endpoint 10 described previously, although it could be used with other videoconferencing systems having more or less cameras. For the dual camera endpoint 10, the room-view camera 50A can be set for the zoomed-out room view, while the people-view camera 50B can track and zoom-in on current speakers as discussed previously. The endpoint 10 can then decide which camera view to output based in part on speaker recognition.

Figures 14, 15:
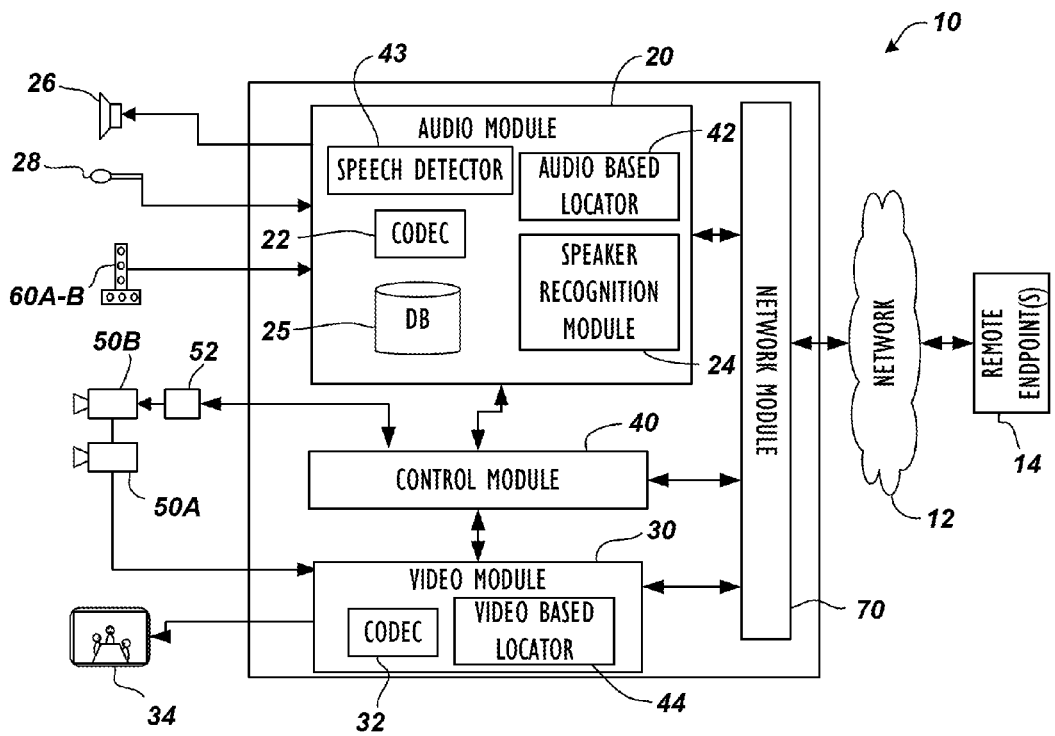
FIG. 14 illustrates another videoconferencing endpoint according to certain teachings of the present disclosure.
FIG. 15 shows a database table for speaker recognition.

For reference, FIG. 14 shows the videoconferencing endpoint 10 having dual cameras 50A-B, microphone arrays 60A-B, external microphone 28, and other components discussed previously. The endpoint 10 also has speaker recognition features, including a speaker recognition module 24 and database 25. These can be associated with the audio module 20 used for processing audio from the external microphone 28 and arrays 60A-B.

The speaker recognition module 24 analyzes audio primarily sampled from the external microphone 28. Using this audio, the speaker recognition module 24 can determine or identify which participant is currently speaking during the videoconference. For its part, the database 25 stores information for making this determination or identification.

As shown in FIG. 15, a database table 480 is shown containing some information that can be used by the speaker recognition module 24 of FIG. 14. This database table 480 is merely provided for illustrative purposes, as one skilled in the art will appreciate that various types of information for the speaker recognition module 24 can be stored in any available way known in the art.

As depicted, the database table 480 can hold a number of records for each of the near-end participants in the videoconference. For each participant, the database table 480 can contain identification information (Name, Title, etc.) for the participant, the determined location of that participant (pan, tilt, zoom coordinates), and characteristics of that participant's speech.

In addition to this, the database table 480 can contain the average duration that the participant has spoken during the videoconference, the number of times the participant has spoken during the videoconference, and other details useful for tracking and recognizing speaking participants. This information can also be used for collecting and reporting statistics of the meeting. For example, the information can indicate the number of speakers in the meeting, how long each one spoke, at what times in the meeting did the speaker participate, etc. In the end, this information can be used to quickly locate a specific section of the videoconference when reviewing a recording of the meeting.

Figure 16:
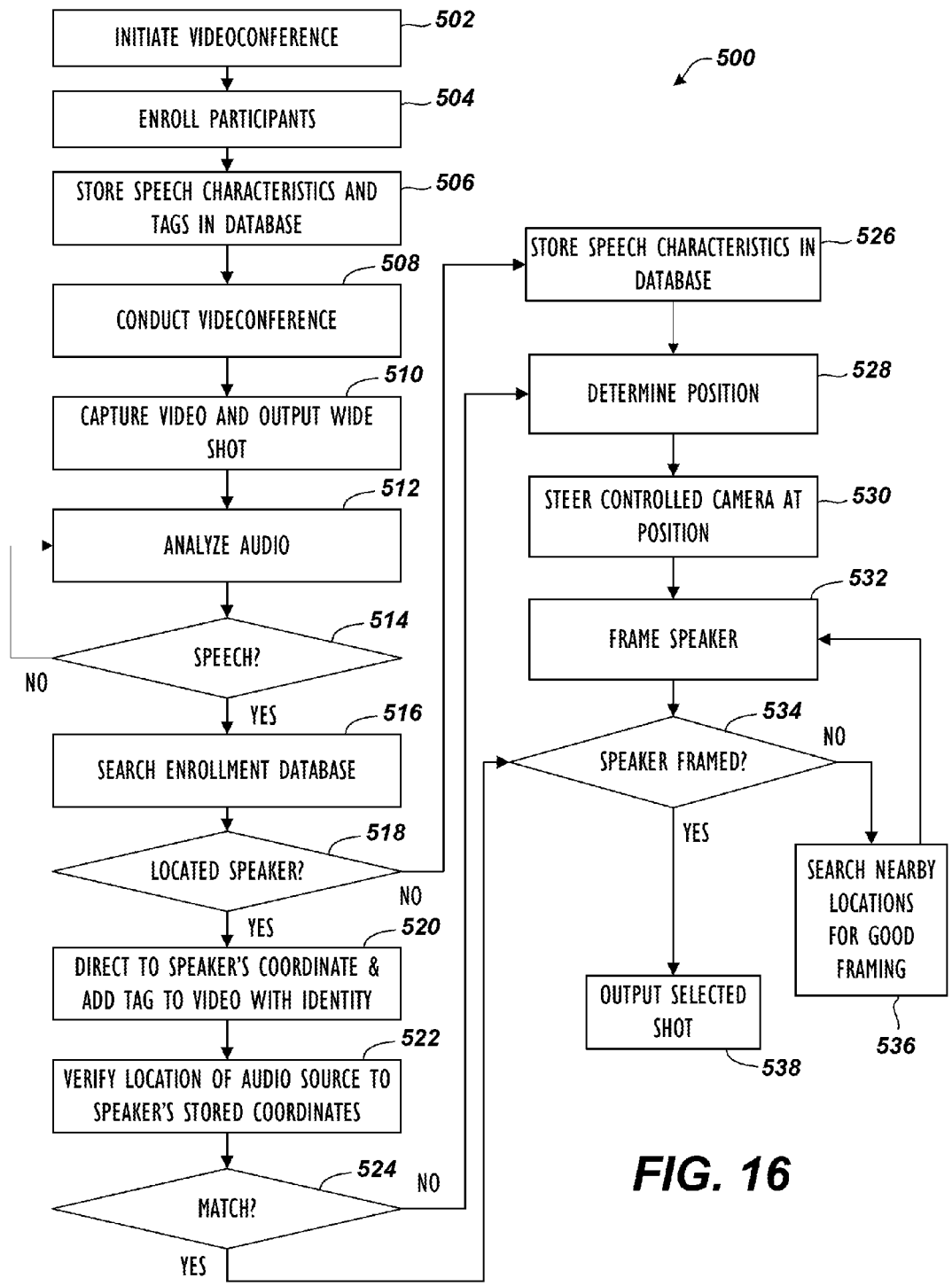
FIG. 16 illustrates a process for identifying speakers during a videoconference using the disclosed endpoint.

Using information such as contained in the database table 480, the speaker recognition module 24 of the endpoint 10 in FIG. 14 can identify a particular speaker from the various participants of the videoconference when speech is detected. For example, FIG. 16 shows a speaker recognition process 500 that can be implemented during a videoconference. First, the endpoint 10 initiates a videoconference (Block 502). As part of the set up of the conference, the participants can enroll in a speaker recognition interface (Block 504), although this is not strictly necessary for the speaker recognition disclosed herein.

When an enrollment procedure is used, a participant enters identification information, such as name, title, and the like, using a user interface. Then, the participant supplies one or more speech samples for the speaker recognition module 24. To obtain the samples, the module 24 may or may not require the participant to say certain scripts, phrases, words, or the like. Either way, the module 24 analyzes the speech samples for the participant and determines characteristics of the participant's speech. Once enrollment is completed, the module 24 then stores the speech characteristics and the identification information in the database 25 for each of the participants for later use (Block 506).

In one implementation, the speaker recognition provided by the module 24 can be based on mel-frequency cepstrum (MFC) so that the speech characteristics stored in the database 25 can include mel-frequency cepstral coefficients (MFCCs). The techniques for deriving these coefficients are known in the art and not detailed herein. Yet, the module 24 can use any other techniques known in the art for indentifying speech characteristics and recognizing speakers therefrom.

With the participants enrolled, the endpoint 10 begins conducting the videoconference (Block 508). Before the people-view camera 50A directs to a speaker, the endpoint 10 captures video and initially outputs the wide view from the room-view camera 50A (Block 510). In the meantime, the endpoint 10 analyzes the local audio captured by the external microphones 28 and/or the microphone arrays 60A-B (Block 512).

At some point, the endpoint 10 determines whether speech is detected using speech detection techniques known in the art (Decision 514). To do this, the endpoint 10's speech detector 43 can sample the captured audio and filter the audio with a filter bank into a plurality of bands. The impulse or amplitude of these bands related to speech can be analyzed to determine whether the currently sampled audio is indicative of speech. Preferably, the captured audio being analyzed is the conference audio obtained with the external microphones 28 rather than that obtained with the arrays 60A-B, although this audio could be used.

If speech is detected, the speaker recognition module 24 samples the detected speech to determine its characteristics, and then the module 24 searches the database 25 for the participant having those characteristics (Block 516). Again, the module 24 can determine the mel-frequency cepstral coefficients (MFCCs) for the current speech using the techniques known in the art. Once done, the endpoint 10 identifies the current speaker by comparing the currently derived characteristics to those stored in the database 25 for the various participants. The identity of the current speaker can then be obtained based on the best match of these characteristics.

If the participant is enrolled, for example, the module 24 locates the speaker in the database (Decision 518), and the endpoint 10 then directs the people-view camera 50B to the speaker's coordinates or direction (Block 520). In this way, the endpoint 10 detects speech, determines the speaker's location using beam-forming with the arrays 60A-B, determines the current speaker's identity, and directs the people-view camera 50B to a zoomed-in view of the current speaker. At this point, the speaker's name can be automatically displayed on the video output to the far-end. As expected, being able to display a current speaker's name at the far-end can be beneficial, especially when the participants at the near and far-ends do not know one another.

As an added measure, the determined location (pan, tilt, and zoom of the people-view camera 50B) of the current speaker obtained through beam-forming with the microphone arrays 60A-B (if not already known) can be stored along with the speaker's identification and speech characteristics in the database 25. In this way, once this speaker begins speaking later in the conference, the module 24 can identify the speaker from the speech characteristics, and the endpoint 10 can then direct the people-view camera 50B directly to the stored location (pan, tilt, and zoom) obtained from the database 25. Thus, the endpoint 10 can forgo having to perform audio tracking of the speaker with the arrays 60A-B, although the speaker recognition can be used to improve the reliably of beating speakers in difficult situations.

When the current speaker's location is already known and is associated with the speech characteristics, for example, the endpoint 10 can verify the location of the current audio source to the speaker's stored location in the database 25 (Block 522). There may be a situation where the speaker recognition and matching to the database entries has erroneously identified one of the participants as the current speaker. To avoid directing the people-view camera 50B to the wrong person or a reflection point, the endpoint 10 does a check and determines whether the determined location matches that previously stored in the database 25 (Decision 524). This may be helpful when there are a large number of participants and when the matching between current speech and stored characteristics is less definitive at identifying the current speaker. Additionally, this checking may be useful if participants are expected to move during the videoconference so that the stored location in the database 25 may be incorrect or outdated.

When attempting to find the current speaker in the database 25 of already enrolled speakers (Decision 518), the module 24 may determine that the speaker is not included in the database 25. For example, someone may have arrived late for the videoconference and may not have enrolled in the speaker identification process. Alternatively, the endpoint 10 may not use an enrollment process and may simply identify new speakers as the conference proceeds.

In any event, the module 24 determines that the speech characteristics derived from the current speaker do not fit a best match to any of the speech characteristics and identities stored in the database 25. In this case, the module 24 stores the speech characteristics in the database 25 (Block 526). The speaker's name may not be attached to the database entry in this instance, unless the endpoint 10 prompts for entry during the conference. At this point, the endpoint 10 can determine the position of the speaker using the microphone arrays 60A-B and the beam-forming techniques described previously and stores it in the database 25 (Block 528). This step is also done if the endpoint 10 has failed to match the located speaker with a stored coordinate (Decision 524). All the same, the speaker's current location may already be known from previous processing so that the endpoint 10 may not need to determine the speaker's position all over again.

In general, the endpoint 10 can use each of its available ways to locate the current speaker and frame that speaker correctly. In this way, information from the microphone arrays (60A-B), video captured with cameras (50A-B), audio from microphone pod (28), and speaker recognition can complement one another when one fails, and they can be used to confirm the results of each other. For example, the direction-finding obtained with the microphone pod (28) can be to check speaker recognition.

Once the position is determined either directly or from storage (Block 528), the endpoint 10 steers the people-view camera 50B towards that determined position (Block 530) and proceeds with the process of framing that speaker in the camera's view (Block 532). As before, the endpoint 10 determines if the speaker is framed properly based on motion, skin tone, facial recognition, and the like (Decision 534), searches the camera's view and adjacent portions if needed (Block 536), and repeats these steps as needed until the selected view framing the speaker can be output to the far-end (Block 538).

If the current speaker is not found in the database and the location cannot be determined through beam-forming, then the endpoint 10 may simply revert to outputting the video from the room-view camera 50A. In the end, the endpoint 10 can avoid outputting undesirable views of the conference room or motion of the people-view camera 50B even when all of its locating and identification techniques fail.

The speaker recognition not only helps display the names of participants when speaking or in verifying that beam-Forming has determined a correct location, but the speaker recognition helps in situations when a speaker cannot be readily located through beam-forming or the like. For example, when a current speaker has their head turned away from the microphone arrays 60A-B, the endpoint 10 may be unable to locate the current speaker using beam-forming or the like. Yet, the speaker recognition module 24 can still identify which participant is matched to stored speakers based on the speech characteristics. From this match, the endpoint 10 finds the already stored location (pan, tilt, and zoom) for directing the people-view camera 50B to that current speaker.

Additionally, the speaker recognition module 24 can prevent the endpoint 10 from prematurely switching views during the videoconference. At some point, for example, the current speaker may turn her head away from the microphone arrays 60A-B, some change in the environment may make a new reflection point, or some other change may occur so that the endpoint 10 can no longer locate the current speaker or finds a different position for the current speaker. Although the endpoint 10 using the arrays 60A-B can tell that someone is speaking, the endpoint 10 may not determine whether the same person keeps speaking or a new speaker begins speaking. In this instance, the speaker recognition module 24 can indicate to the endpoint 10 whether the same speaker is speaking or not. Therefore, the endpoint 10 can continue with the zoomed-in view of the current speaker with the people-view camera 50B rather than switching to another view.

Various changes in the details of the illustrated operational methods are possible without departing from the scope of the following claims. For instance, illustrative flow chart steps or process steps may perform the identified steps in an order different from that disclosed here. Alternatively, some embodiments may combine the activities described herein as being separate steps. Similarly, one or more of the described steps may be omitted, depending upon the specific operational environment in which the method is being implemented.

In addition, acts in accordance with flow chart or process steps may be performed by a programmable control device executing instructions organized into one or more program modules on a non-transitory programmable storage device. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Non-transitory programmable storage devices, sometimes called a computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An automated videoconferencing method for a near-end endpoint located in a near-end environment at a near-end site to conduct a videoconference with one or more far-end endpoints located in one or more far-end environments at one or more far-end sites, the method comprising:
   detecting one or more first audio indicative of speech during the videoconference with the near-end endpoint in the near-end environment at the near-end site;
   determining one or more first speech frequency characteristics of the one or more first audio, the one or more first speech frequency characteristics characterizing frequency information indicative of the speech detected in the one or more first audio;
   determining one or more first source locations of the one or more first audio with the near-end endpoint in the near-end environment at the near-end site;
   directing at least one camera of the near-end endpoint at at least one of the one or more first source locations in the near-end environment;
   storing the one or more first speech frequency characteristics with information of at least one camera directed at the at least one of the one or more first source locations;
   detecting second audio indicative of speech with the near-end endpoint in the near-end environment at the near-end site;
   determining a second speech frequency characteristic of the second audio, the second speech frequency characteristic characterizing frequency information indicative of the speech detected in the second audio; and
   determining that the second speech frequency characteristic does not match the stored one or more first speech frequency characteristics;
   determining a second source location of the second audio with the near-end endpoint in the near-end environment at the near-end site;
   directing the at least one camera of the near-end endpoint at the second source location in the near-end environment; and
   storing the second speech frequency characteristic with information of the at least one camera directed at the second source location.

2. The method of claim 1, wherein the speech frequency characteristics comprise mel-frequency cepstrum coefficients.

3. The method of claim 1, further comprising obtaining the one or more first speech frequency characteristics for storage by detecting the first audio and determining the one or more first speech frequency characteristics when initiating the videoconference.

4. The method of claim 3, further comprising determining the one or more first source locations for storage with the one or more first speech frequency characteristics obtained when initiating the videoconference.

5. The method of claim 1, further comprising obtaining the one or more first speech frequency characteristics for storage by detecting the first audio and determining the one or more first speech frequency characteristics during the videoconference.

6. The method of claim 5, further comprising determining the one or more first source locations for storage with the one or more first speech frequency characteristics obtained during the videoconference.

7. The method of claim 1, wherein the method comprises associating personal information identifying the one or more near-end participants with the one or more first stored speech frequency characteristics.

8. The method of claim 1, wherein the at least one camera comprises a steerable camera of the near-end endpoint, and wherein directing the at least one camera of the near-end endpoint comprises adjusting one or more of a pan, a tilt, and a zoom of the steerable camera.

9. The method of claim 1, further comprising:
determining a current speech characteristic of current audio indicative of speech detected with the near-end endpoint in the near-end environment;
matching the current speech characteristics to one of the stored first speech characteristics;
obtaining the one of the stored first source locations having the stored first speech characteristic that matches the current speech characteristic; and
directing the at least one camera of the near-end endpoint at the matching stored first source location.

10. The method of claim 1, wherein the at least one camera comprises first and second cameras; and wherein before directing the at least one camera, the method comprises switching output from first video captured with the first camera to second video captured with the second camera of the near-end endpoint.

11. The method of claim 10, wherein the second video is captured by the second camera in a wide view of the near-end environment.

12. The method of claim 10, wherein after directing the first camera, the method comprises switching output for the videoconference from the second video to third video captured with the first camera.

13. The method of claim 12, wherein the third video is captured by the first camera in a tight view of the first stored source location.

14. The method of claim 1, wherein directing the at least one camera comprises directing the at least one camera at both of the first and second stored source locations for the first and second audio detected.

15. The method of claim 1, wherein directing the at least one camera of the near-end endpoint at the at least one first source location in the near-end environment comprises:
detecting current audio indicative of speech with the near-end endpoint in the near-end environment;
determining a current speech frequency characteristic of the detected audio;
matching the current speech frequency characteristic to at least one of the one or more first stored speech frequency characteristics; and
directing the at least one camera at the at least one first source location associated with the match.

16. The method of claim 1, wherein determining that the second speech frequency characteristic does not match the stored first speech frequency characteristic comprises comparing the second speech frequency characteristic to the stored first speech frequency characteristic.

17. The method of claim 1, wherein determining the one or more first speech frequency characteristics comprises matching one of the one or more first speech frequency characteristics to one of the one or more first stored speech frequency characteristics for a first of the near-end participants.

18. The method of claim 17, wherein directing the at least one camera of the near-end endpoint at the at least one first source location in the near-end environment for the first participant having the matching one of the first stored speech frequency characteristics comprises
obtaining personal information associated with the first participant;
associating the obtained personal information with first video captured with the at least one camera; and
sending the first video with the associated personal information to the one or more far-end endpoints.

19. The method of claim 18, further comprising:
logging a speech statistic during the videoconference for the near-end participant associated with the matching one of the stored speech frequency characteristics during the videoconference; and
making the logged speech statistic available.

20. The method of claim 19, wherein the speech statistic includes one or more of: a duration that the near-end participant spoke during the videoconference, a number of times that the near-end participant spoke during the videoconference, a time in the videoconference when the near-end participant spoke; and a section in a recording of the videoconference in which the near-end participant spoke.

21. A non-transitory program storage device having program instructions stored thereon for causing a programmable control device to perform an automated videoconferencing method for a near-end endpoint located in a near-end environment at a near-end site conducting a videoconference with one or more far-end endpoints located in one or more far-end environments at one or more far-end sites, the method comprising:
detecting one or more first audio indicative of speech during the videoconference with the near-end endpoint in the near-end environment at the near-end site;
determining one or more first speech frequency characteristics of the one or more first audio, the one or more first speech frequency characteristics characterizing frequency information indicative of the speech detected in the one or more first audio;
determining one or more first source locations of the one or more first audio with the near-end endpoint in the near-end environment at the near-end site;
directing at least one camera of the near-end endpoint at at least one of the one or more first source locations in the near-end environment;
storing the one or more first speech frequency characteristics with information of the at least one camera directed at the at least one of the one or more first source locations;
detecting second audio indicative of speech with the near-end endpoint in the near-end environment at the near-end site;
determining a second speech frequency characteristic of the second audio, the second speech frequency characteristic characterizing frequency information indicative of the speech detected in the second audio; and
determining that the second speech frequency characteristic does not match the stored one or more first speech frequency characteristics;
determining a second source location of the second audio with the near-end endpoint in the near-end environment at the near-end site;
directing the at least one camera of the near-end endpoint at the second source location in the near-end environment; and
storing the second speech frequency characteristic with information of the at least one camera directed at the second source location.

22. A videoconferencing apparatus located in a near-end environment at a near-end site and operatively coupling in a videoconference with one or more far-end endpoints located in one or more far-end environments at one or more far-end sites, the apparatus comprising:
at least one camera being controllable to pan, tilt, and zoom in the near-end environment at the near-end site;
one or more microphones for capturing near-end audio in the near-end environment at the near-end site;

memory storing speech frequency characteristics for near-end participants located in the near-end environment at the near-end site and storing source locations in the near-end environment of the near participants associated with the stored speech frequency characteristics; and a processing unit operatively coupled to the at least one camera, the one or more microphones, and the memory, the processing unit being operable to:

detect one or more first audio indicative of speech during the videoconference with the near-end endpoint in the near-end environment at the near-end site;

determine one or more first speech frequency characteristics of the one or more first audio, the one or more first speech frequency characteristics characterizing frequency information indicative of the speech detected in the one or more first audio;

determine one or more first source locations of the one or more first audio with the near-end endpoint in the near-end environment at the near-end site;

direct at least one camera of the near-end endpoint at at least one of the one or more first source locations in the near-end environment;

store the one or more first speech frequency characteristics with information of the at least one camera directed at the at least one of the one or more first source locations;

detect second audio indicative of speech with the near-end endpoint in the near-end environment at the near-end site;

determine a second speech frequency characteristic of the second audio, the second speech frequency characteristic characterizing frequency information indicative of the speech detected in the second audio; and determine that the second speech frequency characteristic does not match the stored one or more first speech frequency characteristics;

determine a second source location of the second audio with the near-end endpoint in the near-end environment at the near-end site;

direct the at least one camera of the near-end endpoint at the second source location in the near-end environment; and store the second speech frequency characteristic with information of the at least one camera directed at the second source location.

* * * * *